United States Patent [19]

Nguyen

[11] Patent Number: 5,436,940
[45] Date of Patent: Jul. 25, 1995

[54] QUADRATURE MIRROR FILTER BANKS AND METHOD

[75] Inventor: Truong Q. Nguyen, Arlington, Mass.

[73] Assignee: Massachusetts Institute of Technology, Cambridge, Mass.

[21] Appl. No.: 896,000

[22] Filed: Jun. 11, 1992

[51] Int. Cl.$^6$ .............................................. H04B 1/66
[52] U.S. Cl. ...................................... 375/240; 381/36
[58] Field of Search ................... 375/122, 25, 58, 103, 375/13; 381/33, 31, 36; 348/398; 395/2.12, 2.14; 364/725, 726, 715.02

[56] References Cited

U.S. PATENT DOCUMENTS 5,109,419  4/1992  Fielder et al. ........................ 375/122
5,214,678  5/1993  Rault et al. .......................... 375/122

OTHER PUBLICATIONS

"A Quadrature Constrained Least Square to the Design of Digital Filter Banks" by T. Q. Nguyen, Proc. 1992 IEEE, May 1992, pp. 1344–1347.

R. E. Crochiere and L. R. Rabiner, Multirate Signal Processing, Prentice-Hall, Englewood Cliffs, N.J., pp. 76–100, 1983.

T. P. Barnwell, III, "Subband Coder Design Incorporating Recursive Quadrature Filters and Optimum ADPCM Coders," IEEE Trans. on ASSP, vol. ASSP-30, pp. 751–765, Oct. 1982.

R. V. Cox, "The Design of Uniformly and Non-Uniformly Spaced Pseudoquadrature Mirror Filters," IEEE Trans. on ASSP, vol. ASSP-34, No. 5, pp. 1090–1096, Oct. 1986.

Z. Doganata, P. P. Vaidyanathan and T. Q. Nguyen, "General Synthesis Procedures for FIR Lossless Transfer Matrices for Perfect Reconstruction Multirate Filter Bank Application," IEEE Trans. on ASSP, pp. 1561–1574, Oct. 1988.

J. Masson and Z. Picel, "Flexible Design of Computationally Efficient Nearly Perfect QMF Filter Banks," IEEE Int. Conf. ASSP, Tampa, Florida, pp. 14.7.1–14.7.4, Mar. 1985.

F. Mintzer, "On Half-Band, Third-Band, and Nth Band FIR Filters and their Design," IEEE Trans. on ASSP, vol. ASSP-30, pp. 734–738, Oct. 1982.

F. Mintzer, "Filters for Distortion-Free Two-Band Multirate Filter Banks," IEEE Trans. on ASSP, pp. 626–630, Jun. 1985.

K. Schittkowski, "On the Convergence of a Sequential Quadratic Programming Method with an Augmented Lagrangian Line Search Function," Mathematik Operationsforschung und Statistik, Serie Optimization, 14, pp. 197–216, 1983.

K. Schittkowski, "NLPQL: A Fortran Subroutine Solving Constrained Nonlinear Programming Problems", (edited by Clyde L. Monna), Annals of Operations Research, 5, pp. 485–500, 1986.

P. P. Vaidyanathan and P. Q. Hoang, "Lattice Structure for Optimal Design and Robust Implementation of (List continued on next page.)

Primary Examiner—Stephen Chin
Assistant Examiner—Tesfaldet Bocure
Attorney, Agent, or Firm—David Newman & Associates

[57] ABSTRACT

M-channel pseudo-quadrature-mirror-filter (QMF) banks using a prototype filter having a linear-phase spectral-factor of a $2M^{th}$ band filter. The overall transfer function of the analysis filter/synthesis filter system is a delay, and the aliasing cancellation has all the significant aliasing terms canceled. Consequently, the aliasing level at the output of the pseudo-QMF banks is comparable to the stopband attenuation of the prototype filter, with the error at the output of the analysis filter/synthesis filter system approximately equal to the aliasing error at the level of the stopband attenuation. The pseudo-QMF banks have the stopband attenuation of the analysis filters and thus synthesis filters of $-100$ dB. The resulting reconstruction error is also on the order of $-100$ dB. Optimization of the pseudo-QMF banks by a quadratic-constrained least-squares formulation converges very fast as both a cost function and constraints are quadratic functions with respect to unknown parameters, providing a much higher stopband attenuation compared to previous filter banks.

12 Claims, 20 Drawing Sheets

OTHER PUBLICATIONS

Two-Channel Perfect-Reconstruction QMF Bank," IEEE Trans. on ASSP, pp. 81–94, Jan. 1988.

R. V. Cox, D. E. Boch, K. B. Bauer, J. D. Johnston, and J. H. Snyder, "The Analog Voice Privacy System," Proc. IEEE Int. Conf. ASSP, pp. 341–344, Apr., 1986.

D. Esteban and C. Galund, "Application of Quadrature Mirror Filters to Split-Band Voice Coding Schemes," Proc. IEEE Int. Conf. ASSP, Hartford, Conn., pp. 191–195, May 1977.

R. D. Koilpillai and P. P. Vaidyanathan, "A Spectral Factorization Approach to Pseudo-QMF Design", IEEE Int. Symp. CAS, Singapore, May 1991.

R. D. Koilpillai and P. P. Vaidyanathan, "New Results of Cosine-Modulated FIR Filter Banks Satisfying Perfect Reconstruction", Technical Report, California Institute of Technology, Nov. 1990.

H. S. Malvar, "Extended Lapped Transforms: Fast Algorithms and Applications", Proc. IEEE Int. Conf. ASSP, Toronto, Canada, pp. 1797–1800, May 1991.

T. Q. Nguyen and P. P. Vaidyanathan, "Structures for M-Channel Perfect Reconstruction FIR QMF Banks Which Yield Linear-Phase Analysis Filters", IEEE Trans. on ASSP., pp. 433–446, Mar. 1990.

T. A. Ramstad and J. P. Tanem, "Cosine-Modulated Analysis-Synthesis Filter Bank with Critical Sampling and Perfect Reconstruction", Proc. IEEE Int. Conf. ASSP., Toronto, Canada, pp. 1789–1792, May 1991.

J. H. Rothweiler, "Polyphase Quadrature Filters—A New Subband Coding Technique," IEEE Int. Conf. ASSP, Boston, pp. 1280–1283, 1983.

M. Vetterli, "A Theory of Multirate Filter Banks," IEEE Trans. on ASSP, vol. ASSP-35, pp. 356–372, Mar. 1987.

J. W. Woods and S. P. O'Neil, "Subband Coding of Images," IEEE Trans. on ASSP, vol. ASSP-34, pp. 1278–1288, Oct. 1986.

M. G. Bellanger, G. Bonnerot, and M. Coudreuse, "Digital Filtering by Polyphase Network: Application to Sample-Rate Alteration and Filter Banks," IEEE Trans. on ASSP, vol. ASSP-24, pp. 109–114, Apr. 1976.

R. D. Koilpillai and P. P. Vaidyanathan, "New Results of Cosine-Modulated FIR Filter Banks Satisfying Perfect Reconstruction", Proc. IEEE Int. Conf. ASSP, Toronto, Canada, pp. 1793–1796, May 1991.

T. Q. Nguyen, "Eigenfilter for the Design of Linear-Phase Filters with Arbitrary Magnitude Response", IEEE Conf. ASSP, Toronto, Canada, pp. 1981–1984, May 1991.

H. J. Nussbaumer, "Pseudo QMF Filter Bank," IBM Technical Disclosure Bulletin, vol. 24, No. 6, pp. 3081–3087, Nov. 1981.

M. J. Smith and T. P. Barnwell, III, "Exact Reconstruction Techniques for Tree-Structured Subband Coders," IEEE Trans. on ASSP, vol. ASSP-34, pp. 431–441, Jun. 1986.

P. P. Vaidyanathan, "Theory and Design of M-Channel Maximally Decimated Quadrature Mirror Filters with Arbitrary M, Having Perfect Reconstruction Property," IEEE Trans. on ASSP, vol. ASSP-35, pp. 476–492, Apr. 1987.

P. P. Vaidyanathan and T. Q. Nguyen, "A 'Trick' for the Design of FIR Halfband Filters," IEEE Trans. CAS., vol. CAS-34, pp. 297–300, Mar. 1987.

P. P. Vaidyanathan and T. Q. Nguyen, "Eigenfilters: A New Approach to Least Squares FIR Filter Design and Applications Including Nyquist Filters," IEEE Trans. CAS, vol. 34, pp. 11–23, Jan. 1987.

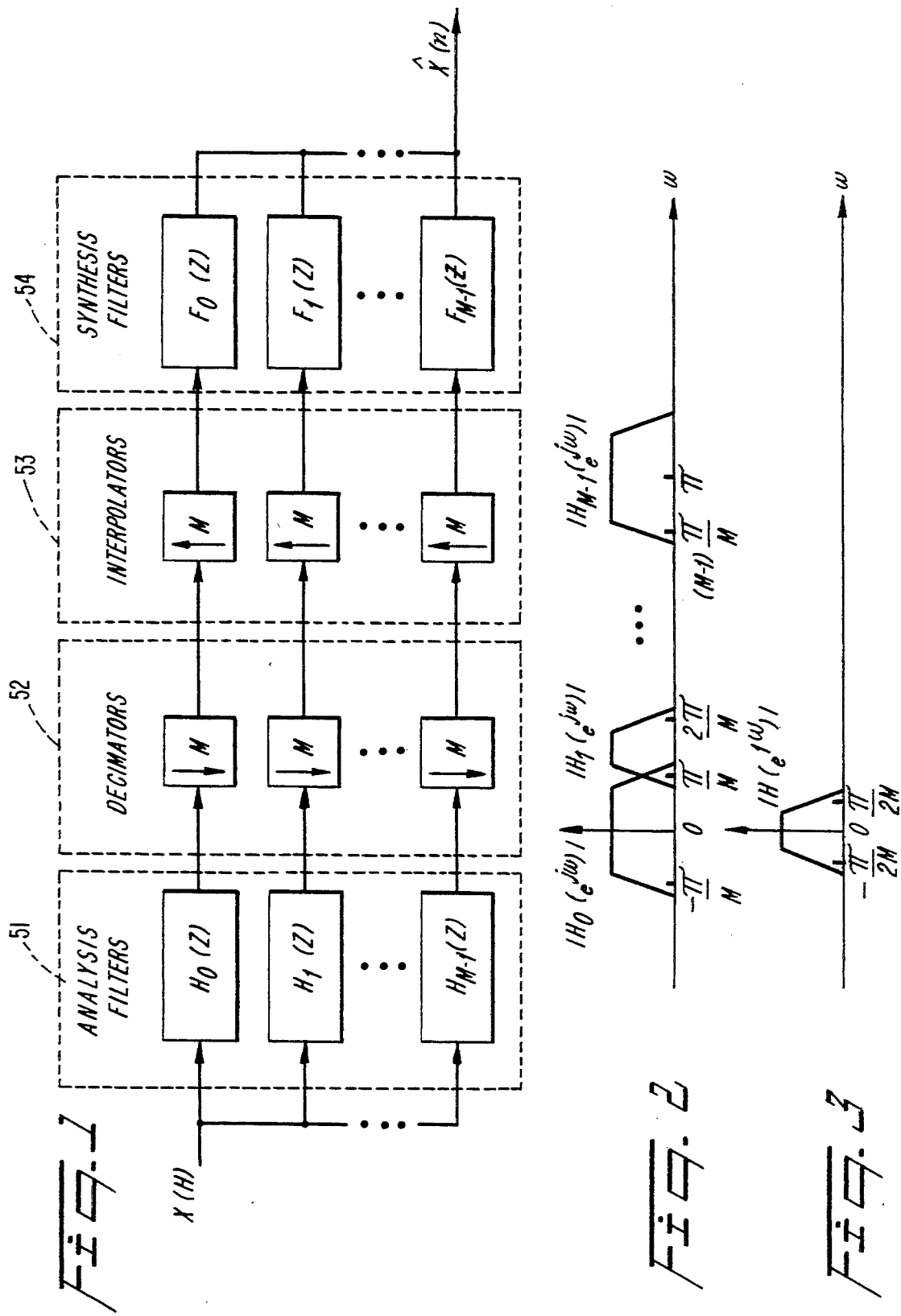

m = 12, M = 16, N = 384 m = 12, M = 16, N = 384
RECONSTRUCTION ERROR

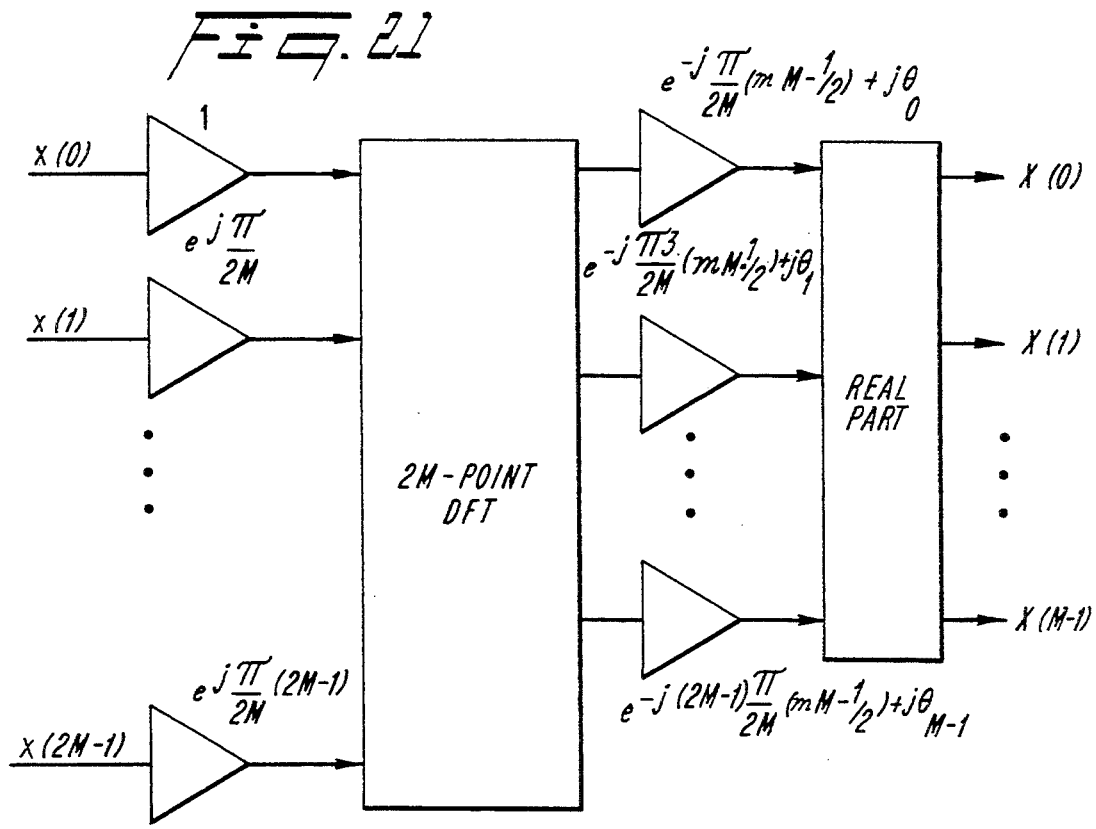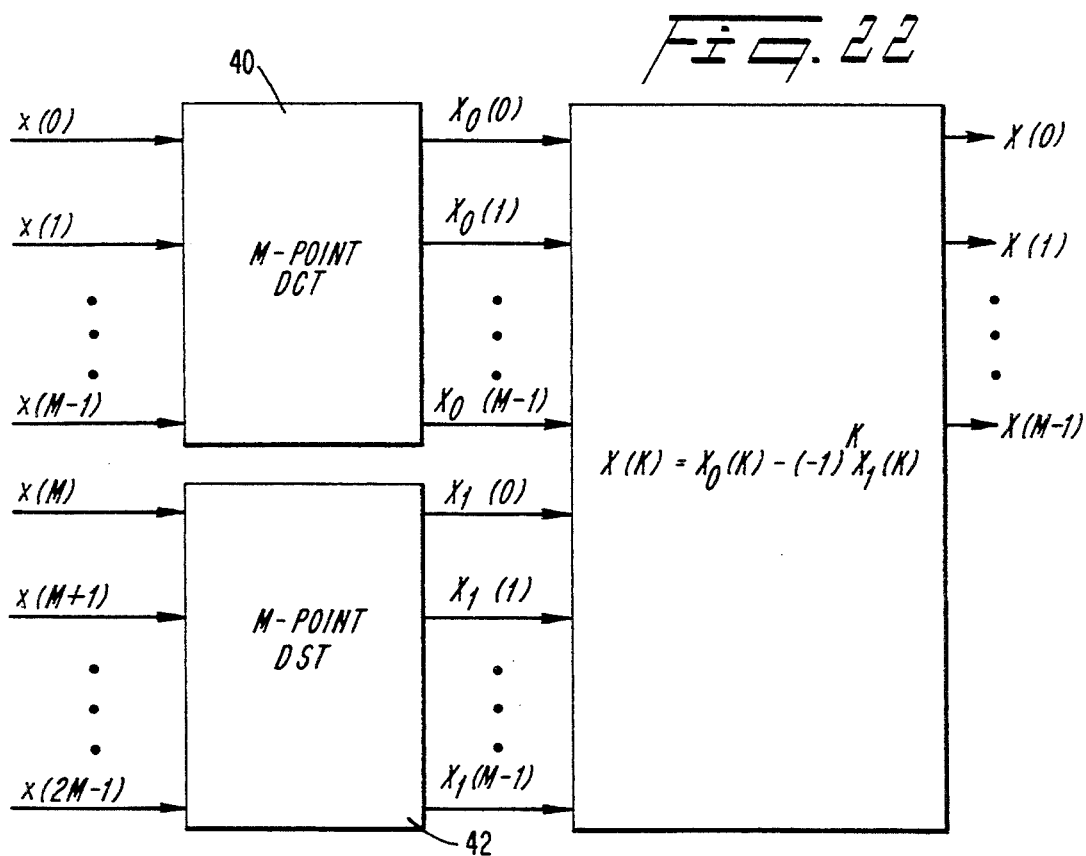

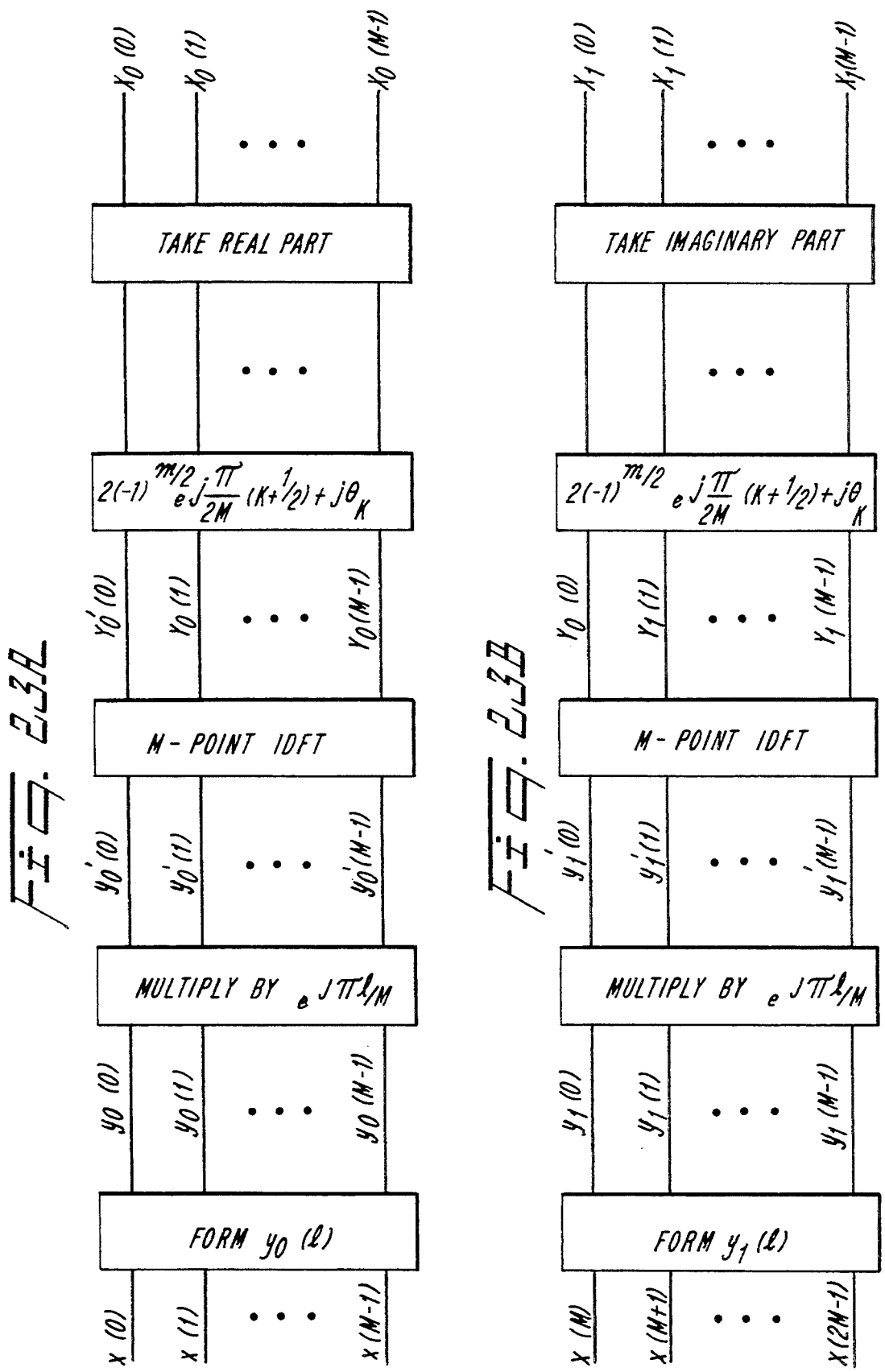

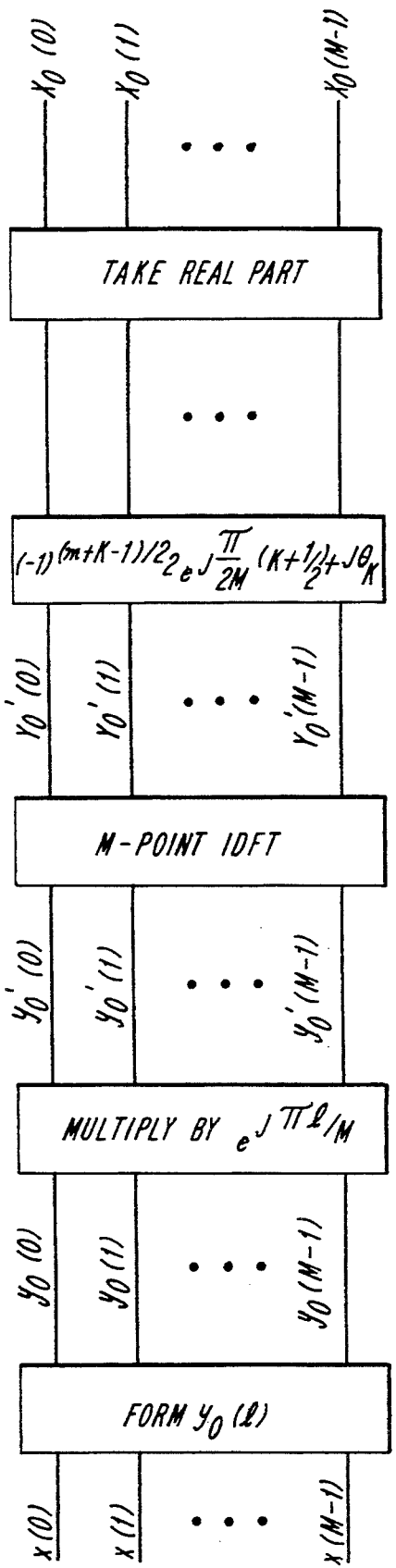
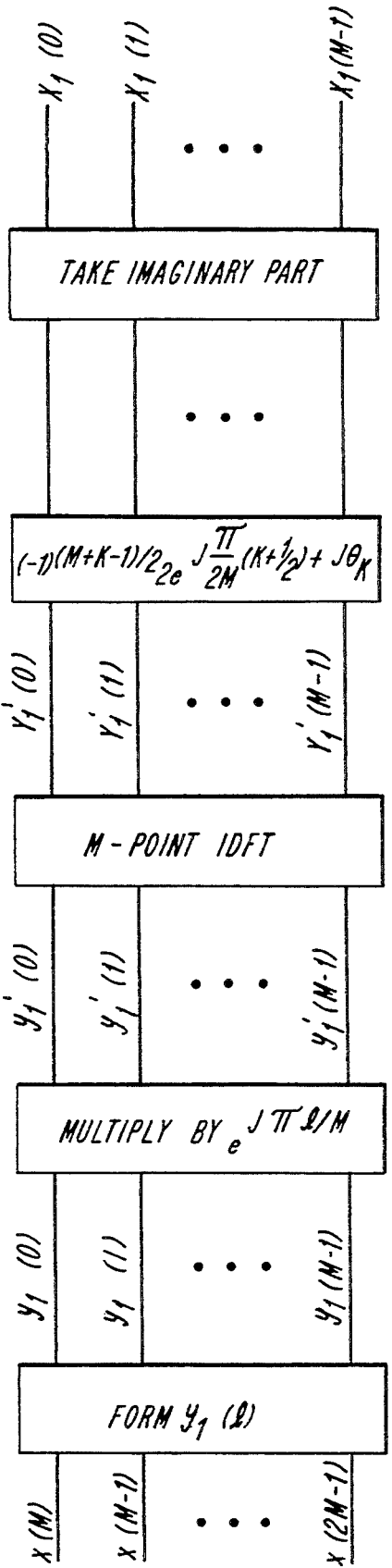

QUADRATURE MIRROR FILTER BANKS AND METHOD

BACKGROUND OF THE INVENTION

This invention relates to M-channel pseudo-quadrature-mirror-filter banks, and more particularly to analysis filters and synthesis filters with high stopband attenuation, and with small overall distortion and alias level.

DESCRIPTION OF THE RELEVANT ART

Digital filter banks are used in a number of communication applications such as subband coders for speech signals, frequency domain speech scramblers, and image coding, with such applications taught by D. Esteban and C. Galand, "Application of Quadrature Mirror Filters to Split-Band Voice Coding Schemes," PROC. IEEE INT. CONF. ASSP, Hartford, Conn., pp. 191-195, May 1977; R. E. Crochiere and L. R. Rabiner, MULTIRATE SIGNAL PROCESSING, Prentice-Hall, Englewood Cliffs, N.J., 1983; T. P. Barnwell, III, "Subband Coder Design Incorporating Recursive Quadrature Filters and Optimum ADPCM Coders", IEEE TRANS. ON ASSP, Vol. ASSP-30, pp. 751-765, Oct. 1982; R. V. Cox, D. E. Boch, K. B. Bauer, J. D. Johnston, and J. H. Snyder, "The Analog Voice Privacy System," PROC. IEEE INT. CONF. ASSP, pp. 341-344, April 1986; and J. W. Woods and S. P. O'Neil, "Subband Coding of Images," IEEE TRANS. ON ASSP, Vol. ASSP-34, pp. 1278-1288, Oct. 1986.

FIG. 1 illustrates a typical M-channel maximally-decimated parallel filter bank where $H_k(z)$ and $F_k(z)$, $0 \leq k \leq M-1$, are the transfer functions of the analysis filters 51 and synthesis filters 54, respectively. Only finite impulse response (FIR) filters are considered herein. The analysis filters 51, with transfer function $H_k(z)$, channelize an input signal, $x(n)$, into M subband signals by decimating using decimators 52 the input signal by M. In speech compression and transmission applications, the M subband signals are encoded and then transmitted, as taught by D. Esteban et al., supra.; R. E. Crochiere et al., supra; and T. P. Barnwell, III, supra. At the receiving end, the M subband signals are decoded, interpolated by interpolators 53 and recombined using a set of synthesis filters 54, having transfer functions $F_k(z)$. The decimators 52, which decrease the sampling rate of a signal, and the interpolators 53, which increase the sampling rate of the signal, are denoted by the down-arrowed and up-arrowed boxes in FIG. 1, respectively, as in R. E. Crochiere et al., supra.

The theory for perfect reconstruction has recently been established. See M. J. Smith and T. P. Barnwell, III, "Exact Reconstruction Techniques for Tree-Structured Subband Coders," IEEE TRANS. ON ASSP, Vol. ASSP-34, pp. 431-441, June 1986; F. Mintzer, "Filters for Distortion-Free Two-Band Multirate Filter Banks", IEEE TRANS. ON ASSP, pp. 626-630, June 1985; P. P. Vaidyanathan, "Theory and Design of M-Channel Maximally Decimated Quadrature Mirror Filters With Arbitrary M, Having Perfect Reconstruction Property," IEEE TRANS. ON ASSP, Vol. ASSP-35, pp. 476-492, April 1987; M. Vetterli, "A Theory of Multirate Filter Banks," IEEE TRANS. ON ASSP, Vol. ASSP-35, pp. 356-372, March 1987; and T. Q. Nguyen and P. P. Vaidyanathan, "Structures for M-Channel Perfect-Reconstruction FIR QMF Banks Which Yield Linear-Phase Analysis Filters", IEEE TRANS. ON ASSP, pp. 433-446, March 1990.

In all applications where perfect-reconstruction is the crucial requirement for the filter bank, the filters must satisfy the following condition, according to P. P. Vaidyanathan, "Theory and Design of M-Channel Maximally Decimated Quadrature Mirror Filters With Arbitrary M, Having Perfect Reconstruction Property," IEEE TRANS. ON ASSP, Vol. ASSP-35, pp. 476-492, April 1987:

$$\begin{pmatrix} H_0(z) & H_1(z) & \ldots & H_{M-1}(z) \\ H_0(zQ) & H_1(zQ) & \ldots & H_{M-1}(zQ) \\ . & . & & . \\ . & . & & . \\ . & . & & . \\ H_0(zQ^{M-1}) & H_1(zQ^{M-1}) & \ldots & H_{M-1}(zQ^{M-1}) \end{pmatrix} \begin{pmatrix} F_0(z) \\ F_1(z) \\ . \\ . \\ . \\ F_{M-1}(z) \end{pmatrix} = \begin{pmatrix} z^{-n_0} \\ 0 \\ . \\ . \\ . \\ 0 \end{pmatrix} \quad (1)$$

where $Q = e^{j2\pi/M}$. Starting from equation (1), one can derive many procedures to find $H_k(z)$ and $F_k(z)$. One such procedure may involves lossless polyphase transfer matrices, as in P. P. Vaidyanathan, "Theory and Design of M-Channel Maximally Decimated Quadrature Mirror Filters With Arbitrary M, Having Perfect Reconstruction Property," IEEE TRANS. ON ASSP, Vol. ASSP-35, pp. 476-492, April 1987; and M. G. Bellanger, G. Bonnerot and M. Coudreuse, "Digital Filtering by Polyphase Network: Application to Sample-Rate Alteration and Filter Banks," IEEE TRANS. ON ASSP, vol. ASSP-24, pp. 109-114, Apr. 1976.

According to P. P. Vaidyanathan, "Theory and Design of M-Channel Maximally Decimated Quadrature Mirror Filters With Arbitrary M, Having Perfect Reconstruction Property," IEEE TRANS. ON ASSP, Vol. ASSP-35, pp. 476-492, April 1987; and Z. Doganata, P. P. Vaidyanathan and T. Q. Nguyen, "General Synthesis Procedures for FIR Lossless Transfer Matrices for Perfect Reconstruction Multirate Filter Bank Application," IEEE TRANS. ON ASSP, pp. 1561-74, Oct. 1988, the lossless transfer matrices are cascades of several lossless lattice building blocks, where one optimizes the lattice coefficients to minimize the cost function:

$$\Phi = \sum_{k=0}^{M-1} \beta_k \phi_{H_k} \quad (2)$$

where the $\phi_{H_k}$ are the stopband errors of $|H_k(\rho^{j\omega})|$. Once the $H_k(z)$ are found, $F_k(z)$ can be obtained from $F_k(z) = H_k(z^{-1})$.

The drawback of the lattice approach is that the cost function $\Phi$ in equation (2) is a highly nonlinear function with respect to the lattice coefficients, according to Z. Doganata et al., supra. Consequently, perfect reconstruction filter banks having analysis filters with high stopband attenuation are difficult to obtain. Therefore, instead of optimizing in the lattice coefficient space, it is preferable to use the filter coefficients directly, with the cost function $\Phi$ of equation (2) and the perfect reconstruction conditions in equation (1) expressed as quadratic functions of the filter coefficients, in order to obtain perfect reconstruction filter banks with high stopband attenuation.

The perfect-reconstruction cosine-modulated filter bank is considered an optimum filter bank with respect to implementation cost and ease of design, as in T. A. Ramstad and, J. P. Tanem, "Cosine-Modulated Analysis-Synthesis Filter Bank With Critical Sampling and Perfect Reconstruction", PROC. IEEE INT. CONF. ASSP, Toronto, Canada, pp. 1789–1792, May 1991; R. D. Koilpillai and P. P. Vaidyanathan, "New Results of Cosine-Modulated FIR Filter Banks Satisfying Perfect Reconstruction", PROC. IEEE INT. CONF. ASSP, Toronto, Canada, pp. 1793–1796, May 1991; R. D. Koilpillai and P. P. Vaidyanathan, "A Spectral Factorization Approach to Pseudo-QMF Design", IEEE INT. SYMP. CAS, Singapore, May 1991; and R. D. Koilpillai and P. P. Vaidyanathan, "New Results on Cosine-Modulated FIR Filter Banks Satisfying Perfect Reconstruction", Technical Report, California Institute of Technology, Nov. 1990. The impulse responses, $h_k(n)$ and $f_k(n)$, Of the analysis and synthesis filters are, respectively, cosine-modulated versions of the impulse response of the prototype filter h(n), as in R. D. Koilpillai and P. P. Vaidyanathan, "New Results of Cosine-Modulated FIR Filter Banks Satisfying Perfect Reconstruction", PROC. IEEE INT. CONF. ASSP, Toronto, Canada, pp. 1793–1796, May 1991. More particularly, the impulse responses of the analysis and synthesis filters are $$h_k(n) = \tag{3}$$

$$2h(n)\cos\left( (2k+1)\frac{\pi}{2M}\left( n - \frac{N-1}{2} \right) + (-1)^k \left( \frac{\pi}{4} \right) \right)$$

$$0 \leq n \leq N-1$$

$$f_k(n) =$$

$$2h(n)\cos\left( (2k+1)\frac{\pi}{2M}\left( n - \frac{N-1}{2} \right) - (-1)^k \left( \frac{\pi}{4} \right) \right)$$

$$0 \leq k \leq M-1$$

where N is the length of h(n).

R. D. Koilpillai and P. P. Vaidyanathan, "New Results of Cosine-Modulated FIR Filter Banks Satisfying Perfect Reconstruction" PROC IEEE INT CONF ASSP, Toronto, Canada, pp. 1793–1796, May 1991, shows that the 2M polyphase components of the prototype filter, with transfer function H(z), can be grouped into M power-complementary pairs where each pair is implemented as a two-channel lossless lattice filter bank. See also P. P. Vaidyanathan and P. Q. Hoang, "Lattice Structures for Optimal Design and Robust Implementation of Two-Channel Perfect-Reconstruction QMF banks," IEEE TRANS. ON ASSP, pp. 81–94, Jan. 1988; and R. D. Koilpillai and P. P. Vaidyanathan, "New Results on Cosine-Modulated FIR Filter Banks Satisfying Perfect Reconstruction", Technical Report, California Institute of Technology, Nov. 1990.

The lattice coefficients are optimized to minimize the stopband attenuation of the prototype filter. As demonstrated in R. D. Koilpillai and P. P. Vaidyanathan, "New Results of Cosine-Modulated FIR Filter Banks Satisfying Perfect Reconstruction", PROC. IEEE INT. CONF. ASSP, Toronto, Canada, pp. 1793–1796, May 1991, a 17-channel perfect-reconstruction cosine-modulated filter bank can be designed with −40 dB stopband attenuation. This optimization procedure, however, is very sensitive to changes in the lattice coefficients because of the highly nonlinear relation between the prototype filter, h(n), and the lattice coefficients. As a result, a perfect-reconstruction cosine-modulated filter bank with high stopband attenuation, on the order of −100 dB, is very difficult to design. For more than 2 channels, no example of a perfect-reconstruction cosine-modulated filter bank, where its prototype filter has −100 dB attenuation, has yet been found. Consequently, in order to construct a filter bank with high attenuation, it is judicious to relax the perfect-reconstruction condition. Thus, a filter bank can be constructed, in a practical sense, where the reconstruction error is small, on the order of −100 dB.

The pseudo-QMF banks belong to the family of modulated filter banks. Pseudo-QMF theory is well known and is widely used. See J. H. Rothweiler, "Polyphase Quadrature Filters—A New Subband Coding Technique," IEEE INT. CONF. ASSP, Boston, pp. 1280–1283, 1983; J. Mason and Z. Picel, "Flexible Design of Computationally Efficient Nearly Perfect QMF Filter Banks," IEEE INT. CONF. ASSP, Tampa, Florida, pp. 14.7.1–14.7.4, March 1985; H. J. Nussbaumer, "Pseudo QMF Filter Bank," IBM Technical Disclosure Bulletin, vol. 24, No. 6, pp. 3081–3087, Nov. 1981; and R. V. Cox, "The Design of Uniformly and Non-Uniformly Spaced pseudoquadrature Mirror Filters," IEEE TRANS. ON ASSP, vol. ASSP-34, No. 5, pp. 1090–1096, Oct. 1986. As with the perfect-reconstruction cosine-modulated filter bank of equation (3) above, the analysis and synthesis filters are cosine-modulated versions of a prototype filter. Since the desired analysis and synthesis filters have narrow transition bands and high stopband attenuation, the overlap between nonadjacent filters is negligible. Moreover, J. H. Rothweiler, "Polyphase Quadrature Filters—a New Subband Coding Technique," IEEE INT. CONF. ASSP, Boston, pp. 1280–1283, 1983, shows that the significant aliasing terms from the overlap of the adjacent filters are canceled by the characteristics of the filters. The transfer function, H(z), of the prototype filter is found by minimizing an objective function consisting of the stopband attenuation and the overall distortion. As shown in J. H. Rothweiler, supra; J. Mason et al., supra.; H. J. Nussbaumer, supra.; and R. V. Cox, supra., although it is possible to obtain a pseudo-QMF bank with high attenuation, the overall distortion level might be high, on the order of −40 dB. Accordingly, the overall distortion of the pseudo-QMF bank is not sufficiently small enough for application where a −100 dB error level is required.

R. D. Koilpillai and P. P. Vaidyanathan, "A Spectral Factorization Approach to Pseudo-QMF Design", IEEE INT. SYMP. CAS, Singapore, May 1991, presents an approach to pseudo-QMF design which does not involve any optimization. The prototype filter of a M-channel filter bank is obtained as a spectral factor of a $2M^{th}$ band filter, as in F. Mintzer, "On Half-Band, Third-Band and Nth-Band FIR Filters and Their Design," IEEE TRANS. ON ASSP, vol. ASSP-30, pp. 734–738, Oct. 1982; P. P. Vaidyanathan and T. Q. Nguyen, "A 'Trick' for the Design of FIR Halfband Filters," IEEE TRANS. CAS, vol. CAS-34, pp. 297–300, Mar. 1987. Since the procedure does not guarantee that transfer function, H(z), is a linear-phase filter, the overall transfer function, To(z), of the analysis filter/synthesis filter system is an approximately flat magnitude response in the frequency region $\leq \omega \leq (\pi - )$. Here, e depends on the transition bandwidth of the prototype filter and $0 \leq\ \leq \pi/2M$. Furthermore, since the prototype filter is a spectral factor of a $2M^{th}$ band filter, constructing a filter bank with high attenuation is difficult because of sensitivity in the spectral factor algorithm. Moreover, the overall distortion can be larger near $\omega=0$ and $\omega=\pi$.

Accordingly, in the prior art, constructing a filter bank with high stopband attenuation of approximately −100 dB, a small overall distortion of approximately −100 dB, and small aliasing of approximately −100 dB is a formidable task. As discussed above, the perfect-reconstruction cosine-modulated filter bank is too restrictive and the pseudo-QMF bank is too loose in their constraints. Consequently, the above filter banks, i.e., the perfect-reconstruction cosine-modulated filter bank of R. D. Koilpillai and P. P. Vaidyanathan, "New Results of Cosine-Modulated FIR Filter Banks Satisfying Perfect Reconstruction", PROC. IEEE INT. CONF. ASSP, Toronto, Canada, pp. 1793–1796, May 1991; and of R. D. Koilpillai and P. P. Vaidyanathan, "New Results on Cosine-Modulated FIR Filter Banks Satisfying Perfect Reconstruction", Technical Report, California Institute of Technology, Nov. 1990; and the spectral-factorized pseudo-QMF filter bank of J. H. Rothweiler, supra.; and of R. D. Koilpillai and P. P. Vaidyanathan, "A Spectral Factorization Approach to Pseudo-QMF Design", IEEE INT. SYMP. CAS, Singapore, May 1991, do not yield satisfactory results.

OBJECTS OF THE INVENTION

A general object of the invention is a pseudo-quadrature-mirror-filter bank and method wherein an overall distortion, i.e. an overall transfer function of analysis filters and synthesis filters, is a delay such that there is no magnitude or phase distortion.

An object of the invention is a pseudo-quadrature-mirror-filter bank and method having analysis filters and synthesis filters each having an impulse response different from previous implementations, with the attained impulse response having any errors disappear from the output of the synthesis filters.

A further object of the invention is a pseudo-quadrature-mirror-filter bank and method for a 32-channel system having analysis filters and synthesis filters with high stopband attenuation, e.g. −100 dB, and having a small reconstruction error, e.g. −100 dB.

Another object of the invention is a pseudo-quadrature-mirror-filter bank and method having a small overall distortion, e.g. −100 dB, and having a small alias level, −100 dB.

An additional object of the invention is a near-perfect-reconstruction pseudo-quadrature-mirror-filter bank which can be implemented using polyphase filters and using a 2M point Discrete Cosine Transform (DCT), such as a 2M-point Fast Fourier Transform (FFT).

A further object of the invention is a quadrature-mirror-filter bank and method which has an efficient and easy implementation.

An additional object of the invention is a quadratic-mirror-filter bank formulation and method by least-squares quadratic-constrained optimization which has an efficient and easy implementation.

SUMMARY OF THE INVENTION

According to the present invention, as embodied and broadly described herein, a pseudo-quadrature-mirror filter (QMF) bank is provided comprising a plurality of analysis filters and a plurality of synthesis filters. Each of the plurality of analysis filters and synthesis filters uses a prototype filter. The prototype filter has a linear-phase spectral-factor H(z) of a $2M^{th}$ band filter. The overall transfer function of the analysis filter/synthesis filter system is a delay, i.e. there is no magnitude or phase distortion. Also, aliasing cancellation causes all the significant aliasing terms to cancel. Consequently, the aliasing level at the output of the pseudo-QMF banks is comparable to the stopband attenuation of the prototype filter, with the error at the output of the analysis filter/synthesis filter system approximately equal to the aliasing error at the level of the stopband attenuation.

Each of the analysis filters has an impulse response, $h_k(n)$. The analysis filters are generated by cosine-modulating an impulse response, h(n), of a prototype filter with linear phase, according to:

$$h_k(n) = 2h(n)\cos\left((2k+1)\frac{\pi}{2M}\left(n - \frac{N-1}{2}\right) + \theta_k\right)$$

where $$\theta_k = (-1)^k \frac{\pi}{4},$$

$$0 \leq n \leq N - 1,$$
$$0 \leq k \leq M - 1,$$

and N is the length of the impulse response, h(n), of the prototype filter.

The plurality of synthesis filters are operatively coupled to the plurality of analysis filters. Each synthesis filter has an impulse response, $f_k(n)$, and is formed by cosine-modulating the impulse response, h(n), of the prototype filter according to:

$$f_k(n) = 2h(n)\cos\left((2k+1)\frac{\pi}{2M}\left(n - \frac{N-1}{2}\right) - \theta_k\right)$$

where $$\theta_k = (-1)^k \frac{\pi}{4},$$

$$0 \leq n \leq N - 1,$$
$$0 \leq k \leq M - 1,$$

and N is the length of the impulse response, h(n), of the prototype filter.

The impulse response, h(n), of the protype filter is different from previous implementations. The plurality of analysis filters and the plurality of synthesis filters have a stopband attenuation of approximately −100 dB and with a reconstruction error of approximately −100 dB.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 1 illustrates an M-channel maximally-decimated parallel filter bank;

FIG. 2 shows typical ideal responses of analysis filters, $H_k(z)$;

FIG. 3 shows an ideal response of a prototype filter, $H(z)$;

FIG. 21 illustrates an implementation of a 2M point Discrete Cosine Transform (DCT) using a 2M-point Discrete Fourier Transform (DFT);

FIG. 22 illustrates an implementation of a 2M point DCT using an M-point DCT and an M-point Discrete Sine Transform (DST);

FIGS. 23A–23B illustrate implementations of input signals $X_0(k)$ and $X_1(k)$, respectively, using M-point FFTs for even m; and FIGS. 24A–24B illustrate implementations of input signals $X_0(k)$ and $X_1(k)$, respectively, using M-point FFTs for odd m.

DETAILED DESCRIPTION OF THE PREFERRED EMBODIMENTS

Figure 4:
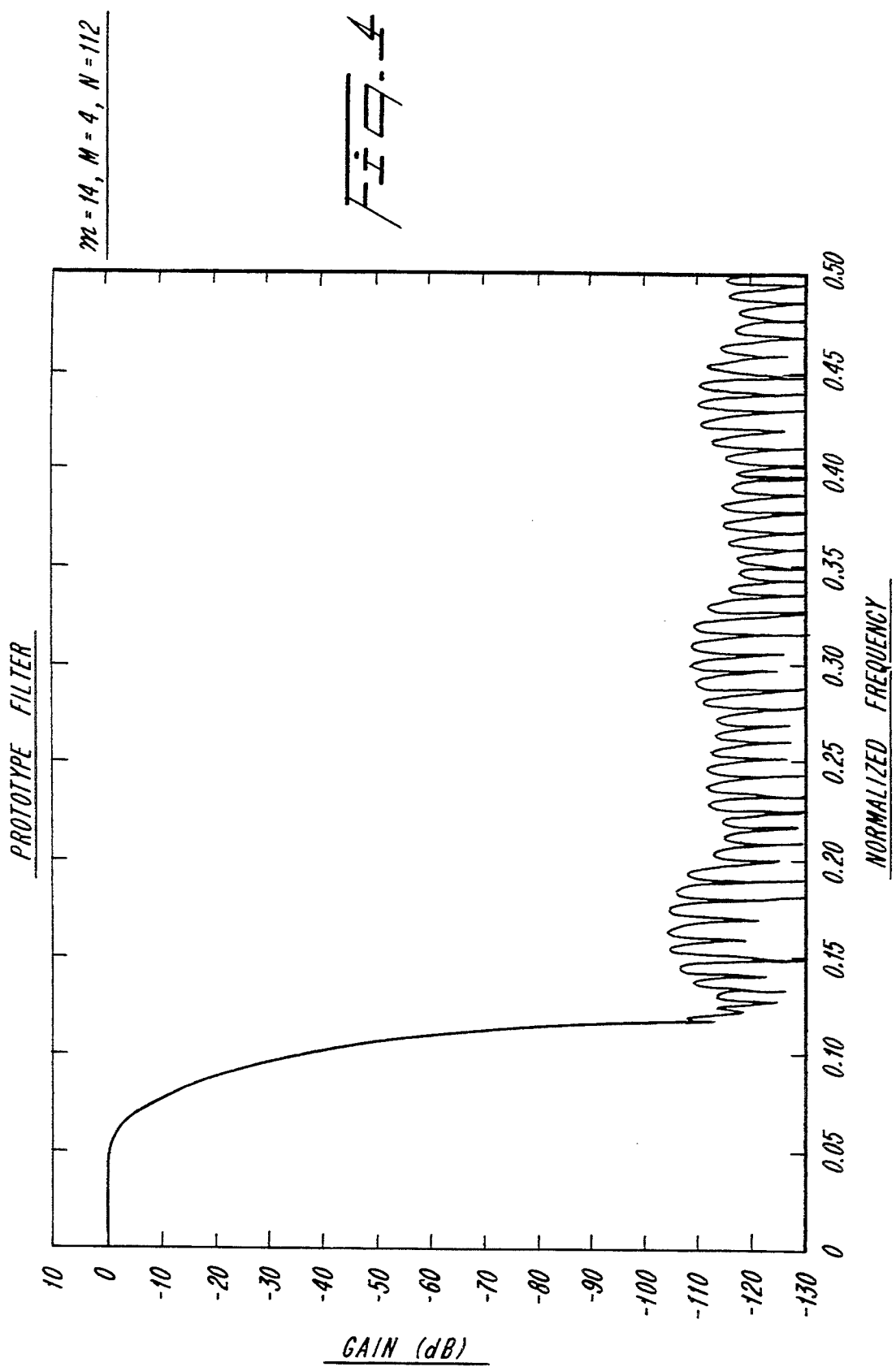
FIG. 4 shows a magnitude response of an optimized prototype filter for a first example.

Reference will now be made in detail to the present preferred embodiments of the invention, examples of which are illustrated in the accompanying drawings, wherein like reference numerals indicate like elements throughout the several views.

In the exemplary arrangement shown in FIG. 1, a pseudo-quadrate-mirror filter bank is provided comprising a plurality of analysis filters and a plurality of synthesis filters. Each of the analysis filters has an impulse response, $h_k(n)$. The analysis filters are generated by cosine-modulating an impulse response, $h(n)$, of a prototype filter with linear phase, according to:

$$h_k(n) = 2h(n)\cos\left((2k+1)\frac{\pi}{2M}\left(n - \frac{N-1}{2}\right) + \theta_k\right)$$

where $$\theta_k = (-1)^k \frac{\pi}{4},$$

$$0 \leq n \leq N - 1,$$
$$0 \leq k \leq M - 1,$$

and N is the length of the impulse response, $h(n)$, of the prototype filter.

The plurality of synthesis filters are operatively coupled to the plurality of analysis filters. Each synthesis filter has an impulse response, $f_k(n)$, and is formed by cosine-modulating the impulse response, $h(n)$, of the prototype filter according to:

$$f_k(n) = 2h(n)\cos\left((2k+1)\frac{\pi}{2M}\left(n - \frac{N-1}{2}\right) - \theta_k\right)$$

where $$\theta_k = (-1)^k \frac{\pi}{4},$$

$$0 \leq n \leq N - 1,$$
$$0 \leq k \leq M - 1,$$

and N is the length of the impulse response, $h(n)$, of the prototype filter.

The impulse response, $h(n)$, of the prototype filter is different from previous implementations. The plurality of analysis filters and the plurality of synthesis filters have a stopband attenuation of approximately −100 dB and with a reconstruction error of approximately −100 dB, as well as have errors disappear at the output of the synthesis filters.

In this discussion, the variable $\omega$ denotes the frequency variable whereas the term "normalized frequency" denotes $f = \omega/2\pi$. Boldfaced quantities denote matrices and column vectors. Upper case letters denote matrices, as in A, and lower case letters denote column vectors, as in $h(z)$, etc. A superscript t stands for matrix transposition, and $$\tilde{H}(z) \triangleq \underline{H}(z^{-1}).$$

Moreover $[A]_{k,l}$ and $[h]_k$ represent the $(k,l)^{th}$ and $k^{th}$ element of the matrix A and vector h, respectively. The K×K identity matrix is denoted as $I_K$; the k×k 'reverse operator' matrix $J_k$ is defined to be:

$$J_k = \begin{pmatrix} 0 & \cdots & 0 & 1 \\ 0 & \cdots & 1 & 0 \\ \vdots & & & \vdots \\ \vdots & & & \vdots \\ 1 & \cdots & 0 & 0 \end{pmatrix}_k$$

and matrix V is defined to be:

$$V = \begin{pmatrix} I_{mM+m1} & 0 \\ 0 & \frac{1}{2} \end{pmatrix}.$$

The subscripts of $I_k$ and $J_k$ are often omitted if they are clear from the context. $W_M$ is defined as $W_M = e^{-j2\pi/M}$, and, unless mentioned otherwise, W is the same as $W_{2M}$.

Pseudo-QMF Banks

Consider the filter bank in FIG. 1 where the ideal frequency responses of the filters $H_k(z)$ are shown in FIG. 2. The reconstructed signal $\hat{X}(z)$ is: where $$M\hat{X}(z) = X(z)T_0(z) + \sum_{l=1}^{M-1} X(zW_M^l)T_l(z) \quad (4)$$

$$T_l(z) = \sum_{k=0}^{M-1} F_k(z)H_k(zW_M^l).$$

From equation (4), $T_0(z)$ is the overall distortion transfer function and $T_l(z)$, 1-0, are the (M−1) aliasing transfer functions corresponding to:

$$X(zW_M^l).$$

Thus, for a perfect-reconstruction system, $$\begin{cases} T_0(z) = z^{-n_0}, \\ T_l(z) = 0, & 1 \le l \le M-1, \end{cases} \quad (5)$$

where $n_0$ is a positive integer. From a practical perspective, the above conditions in equations (5) are too restrictive; it is sufficient to construct the filter bank such that $T_0(z)$ is linear-phase and $$\begin{cases} |T_0(e^{j\omega})| = 1 + \delta_1, \\ |T_l(e^{j\omega})| = \delta_2, & 1 \le l \le M-1, \end{cases}$$

where $\delta_1$ and $\delta_2$ are small numbers ($\approx -100$ dB). In the examples presented later, $\delta_1 \le 1 \times 10^{-12}$ and $\delta_2$ is comparable to the stopband attenuation.

The main properties of pseudo-QMF banks are summarized below:

1. The linear phase prototype filter approximates the frequency response as shown in FIG. 3. A weighted objective function involving the stopband attenuation and the overall magnitude distortion, where the weighted objective function is minimized.

2. The analysis and synthesis filters $H_k(z)$ and $F_k(z)$ are obtained by the modulation of $H(z)$ as follows:

$$\begin{cases} H_k(z) = a_k c_k H(zW^{(k+1/2)}) + a_k^* c_k^* H(zW^{-(k+1/2)}) \\ 0 \le k \le M-1 \\ F_k(z) = a_k^* c_k H(zW^{(k+1/2)}) + a_k c_k^* H(zW^{-(k+1/2)}) \end{cases} \quad (6)$$

where $$a_k = e^{j\theta_k}, \quad c_k = W^{(k+\frac{1}{2})(\frac{N-1}{2})}$$

and N is the length of H(z). The impulse response coefficients $h_k(n)$ and $f_k(n)$ are, respectively, given by:

$$h_k(n) = 2h(n)\cos\left((2k+1)\frac{\pi}{2M}\left(n - \frac{(N-1)}{2}\right) + \theta^k\right) \quad \begin{matrix} 0 \le n \le N-1 \\ 0 \le k \le M-1. \end{matrix}$$

$$f_k(n) = 2h(n)\cos\left((2k+1)\frac{\pi}{2M}\left(n - \frac{(N-1)}{2}\right) - \theta^k\right) \quad (7)$$

From equations (6) and (7), the analysis and synthesis filters are related as:

$$\begin{cases} f_k(n) = h_k(N-1-n) \\ F_k(z) = z^{-(N-1)}\tilde{H}_k(z) \end{cases} \quad 0 \le k \le M-1.$$

3. $\theta_k$ are chosen such that $$\theta_{k+1} = \theta_k \pm \frac{\pi}{2}, \quad 0 \le k < M-1, \quad (8)$$

so that all the significant aliasing terms are canceled.

Furthermore, in order to ensure relatively flat overall magnitude distortion, $$\theta_0 = \pm\left(\frac{\pi}{4} + l\frac{\pi}{2}\right) \text{ and } \theta_{M-1} = \pm\left(\frac{\pi}{4} + m\frac{\pi}{2}\right), \quad (9)$$

where l and m are arbitrary integers. Although other choices are possible, the following choice is used in this application:

$$\theta_k = (-1)^k \frac{\pi}{4}, \quad 0 \le k \le M-1, \quad (10)$$

which satisfies both (8) and (9).

4. The overall transfer function $T_0(z)$ is $$T_0(z) = \frac{1}{M}\sum_{k=0}^{M-1} H_k(z)F_k(z)$$

$$= \frac{z^{-(N-1)}}{M}\sum_{k=0}^{M-1} H_k(z)\tilde{H}_k(z).$$

Note that the above $T_O(z)$ has linear-phase independent of $H_k(z)$; therefore, the reconstructed signal has no phase distortion.

The main properties of the spectral factorization approach to pseudo-QMF design are summarized as follows:

1. The prototype filter $H(z)$ does not have linear-phase symmetry since it is obtained by spectral factorization. The length N is assumed to be a multiple of M, i.e. $N=mM$. No optimization procedure is needed. First a $2M^{th}$ band filter $G'(z)$ is found, by letting $\zeta_2$ be the stopband attenuation of $G'(z)$. Form $G(z)$ by $G(z)=G'(z)+\zeta_2$, then find a spectral factor of $G(z)$ and set the spectral factor to $H(z)$.

2. Let $b_k = e^{j\phi_k}$ and $$S_k(z) \triangleq b_k H(zW^{(k+\frac{1}{2})}) + b_k^* H(zW^{-(k+\frac{1}{2})}),$$

then the analysis and synthesis filters $H_k(z)$ and $F_k(z)$ are obtained as follows:

$$H_k(z) = \begin{cases} S_k(z), & \forall \text{ even } k \\ z^{-(N-1)}\widetilde{S}_k(z), & \forall \text{ odd } k \end{cases}$$

and $$F_k(z) = z^{-(N-1)}\widetilde{H}_k(z), \quad 0 \leq k \leq M - 1.$$

Note that the above choice for $F_k(z)$ ensures the linearity in the phase response of $T_0(z)$. The impulse response coefficients $h_k(n)$ and $f_k(n)$ are given by:

$$h_k(n) = \begin{cases} s_k(n), & \forall \text{ even } k \\ s_k(N - 1 - n), & \forall \text{ odd } k \end{cases}$$

and $$f_k(n) = h_k(N - 1 - n),$$

where $$s_k(n) = 2h(n)\cos\left((2k + 1)\frac{\pi}{2M} n + \phi_k\right).$$

3. In order to ensure cancellation of the significant aliasing terms, $\phi_k$ should satisfy:

$$\phi_{k+1} = \pm(2i + 1)\frac{\pi}{2} - \phi_k, \quad 0 \leq k \leq M - 2, \tag{11}$$

where i is an integer.

One of the choices that satisfies equation (11) is $$\phi_k = \frac{\pi}{4} \; \forall k.$$

4. The overall transfer function $T_0(z)$ is $$T_0(z) = \frac{z^{-(N-1)}}{M} \cdot c + \frac{z^{-(N-1)}}{M} [P_1(z) + P_2(z)],$$

where $P_1(z)$ and $P_2(z)$ cannot be eliminated for any choice of $\phi_k$. The magnitude response of $P_1(z)$ is significant only in the region $|\omega| < \epsilon$, whereas the magnitude response of $P_2(z)$ is significant only in the region $(\pi - \epsilon) < |\omega| < (\pi + \epsilon)$, where $\epsilon$ depends on the transition bandwidth of $H(z)$ and $$0 < \epsilon < \frac{\pi}{2M}.$$

Consequently, $|T_0(e^{j\omega})| \simeq$ constant, with $\epsilon \leq \omega \leq (\pi - \epsilon)$, but $|T_0(e^{j\omega})|$ can have bumps or dips around $\omega=0$ and $\omega=\pi$, depending on the values of $P_1(z)$ and $P_2(z)$.

The pseudo-QMF bank of the present invention is a hybrid of the above pseudo-QMF constructs. First, the prototype filter $H(z)$ is chosen to be a linear-phase filter. Moreover, $H(z)$ is found such that it is a spectral factor of a $2M^{th}$ band filter. The analysis and synthesis filters, $h_k(n)$ and $f_k(n)$, respectively, are cosine-modulated versions of the prototype filter $h(n)$ as in equation (7) with $\theta_k$ chosen as in equation (10).

This choice of modulation yields an efficient implementation for the whole analysis filter/synthesis filter system. Together with the above $2M^{th}$ band constraint, it will be shown that $T_0(z) \simeq$ a delay. Even though $H(z)$ is a spectral factor of a $2M^{th}$ band filter, no spectral factorization is needed in the approach of the present invention. In other words, the $2M^{th}$ band constraints are imposed approximately.

Properties of the Pseudo-QMF Bank

Let $$H(z) = \sum_{n=0}^{N-1} h(n)z^{-n}$$

be the real-coefficient, linear-phase, even length prototype filter of length N. Assume that $H(z)$ is a spectral factor of a $2M^{th}$ band filter $G(z)$, i.e., $$G(z) = z^{-(N-1)}\widetilde{H}(z)H(z) = H^2(z)$$

in lieu of the linear phase property of $H(z)$. The analysis and synthesis filters, $h_k(n)$ and $f_k(n)$, respectively, are cosine-modulated versions of $h(n)$, i.e., $$\begin{cases} h_k(n) = 2h(n)\cos\left((2k + 1)\frac{\pi}{2M}\left(n - \frac{N-1}{2}\right) + (-1)^k \frac{\pi}{4}\right) \\ f_k(n) = 2h(n)\cos\left((2k + 1)\frac{\pi}{2M}\left(n - \frac{N-1}{2}\right) - (-1)^k \frac{\pi}{4}\right) \end{cases} \begin{array}{l} 0 \leq n \leq N - 1 \\ 0 \leq n \leq M - 1. \end{array}$$

Consequently, $H_k(z)$ and $F_k(z)$ are related as $$H_k(z) = \tag{12}$$

$$a_k c_k H(zW^{(k+\frac{1}{2})}) + a_k^* c_k^* H(zW^{-(k+\frac{1}{2})}) \quad 0 \leq k \leq M - 1$$

$$F_k(z) = z^{-(N-1)}\widetilde{H}_K(z)$$

where $$a_k = e^{j\theta_k}, c_k = W^{(k+\frac{1}{2})(\frac{N-1}{2})} \text{ and } \theta_k = (-1)^k \frac{\pi}{4}.$$

Note that the above filter choices are the same as those of the pseudo-QMF bank of J. H. Rothweiler, supra., with the exception that H(z) of the present invention is a spectral factor of a $2M^{th}$ band filter. In the following, it will be shown that the overall transfer function $$T_0(z) = \frac{1}{M} z^{-(N-1)}$$

is a delay.

The Overall Transfer Function $T_0(z)$

When the $\theta_k$ are chosen as in equation (10), the analysis filter/synthesis filter system is 'approximately' alias-free and the overall transfer function $T_0(z)$ can be expressed as $$\frac{\hat{X}(z)}{X(z)} \approx T_0(z) = \frac{z^{-(N-1)}}{M} \sum_{k=0}^{M-1} H_k(z)\tilde{H}_k(z). \quad (13)$$

Setting $R=W^{(k+\frac{1}{2})}$, and substituting (12) into (13), one obtains $$z^{N-1}MT_0(z) = \sum_{k=0}^{M-1} [a_k c_k H(zR) + a_k^* c_k^* H(zR^{-1})] \times$$

$$[a_k^* c_k^* H(z^{-1}R^{-1}) + a_k c_k H(z^{-1}R)] =$$

$$\sum_{k=0}^{M-1} [H(zR)H(z^{-1}R^{-1}) + H(zR^{-1})H(z^{-1}R)] +$$

$$\sum_{k=0}^{M-1} [a_k^2 c_k^2 H(zR)H(z^{-1}R) + (a_k^2 c_k^2)^* H(zR^{-1})H(z^{-1}R^{-1})] =$$

$$\sum_{k=0}^{M-1} [H(zR)H(z^{-1}R^{-1}) +$$

$$H(zR^{-1}W^{2M})H(z^{-1}RW^{-2M})] +$$

$$\sum_{k=0}^{M-1} \{a_k^2 c_k^2 H(zR)H(z^{-1}R) +$$

$$(a_k^2 c_k^2)^* [z^{-(N-1)}R^{(N-1)}H(z^{-1}R)][z^{(N-1)}R^{(N-1)}H(zR)]\}$$

where the linear-phase property of H(z) is used in the last summation of the above equation. After some simplification, one obtains $$Z^{N-1}MT_0(z) = \sum_{k=0}^{2M-1} H(zW^{(k+1/2)})H(z^{-1}W^{-(k+1/2)}) + \quad (14)$$

$$\sum_{k=0}^{M-1} H(zW^{(k+1/2)})H(z^{-1}W^{(k+1/2)})[a_k^2 c_k^2 +$$

$$(a_k^2 c_k^2)^* W^{(N-1)(2K+1)}]$$

and since, $$a_k^2 = W^{M(k+\frac{1}{2})}$$

and $$c_k^2 = W^{(N-1)(k+\frac{1}{2})},$$

after further simplification, the expression in the last summation of equation (14) is 0 for all k, i.e., $$[a_k^2 c_k^2 + (a_k^2 c_k^2)^* W^{(N-1)(2k+1)}] = 0 \; \forall \; k. \quad (15)$$

Substituting (15) into (14) yields $$z^{N-1}MT_0(z) = \sum_{k=0}^{2M-1} H(zW^{(k+1/2)})H(z^{-1}W^{-(k+1/2)}).$$

Since $G(z) = z^{-(N-1)}H(z)H(z^{-1})$ is a $2M^{th}$ band filter, i.e., $$\sum_{k=0}^{2M-1} H(zW^k)H(z^{-1}W^{-k}) = 1, \quad (16)$$

the final result is $$z^{N-1}MT_0(z) = 1, \text{ or equivalently}$$
$$T_0(z) = \frac{1}{M} z^{-N(-1)}.$$

In summary, as long as the prototype filter H(z) is a linear-phase spectral factor of a $2M^{th}$ band filter and the $H_k(z)$ and $F_k(z)$ are obtained as in (12), the overall distortion transfer function $T_0(z)$ is a delay. A linear-phase filter H(z) is found where $G(z)=H^2(z)$ is a $2M^{th}$ band filter. Furthermore, the method produces a prototype filter H(z) with high stopband attenuation. The following sections focus on the present invention for the cases of even N and odd N, respectively.

The Implementation for Even N

In this section, the implementation of the present invention is provided for the even N case, i.e., $N = 2(mM+m_1)$ where $0 \leq m_1 \leq M-1$, with the odd N case considered in the next section. Defining h to be the vector consisting of the first mM coefficients of h(n), i.e., $$h = [h(0) \; h(1) \ldots h(mM+m_1-1)]^t$$

and vector e(z) to be $$e(z) = [1 z^{-1} \ldots z^{-(mM+m_1-1)}]^t,$$

then the prototype filter H(z) can be represented as $$H(z) = \sum_{n=0}^{N-1} H(n)z^{-n} = h^t(IJ)\binom{e(z)}{z^{-(mM+m_1)}e(z)}, \quad (17)$$

where the dimensions of both matrices I and J are $(mM+m_1) \times (mM+m_1)$.

Using the above notation, the $2M^{th}$ band filter G(z) is:

$$G(z) = \sum_{n=0}^{4mN+4m_1-2} g(n)z^{-n} = H^2(z) = \quad (18)$$

$$h^t(IJ)\binom{e(z)}{z^{-(mM+m_1)}e(z)}(e^t(z) \; z^{-(mM+m_1)}e^t(z))\binom{I}{J}h =$$

$$h^t[U(z) + z^{-(mM+m_1)}(JU(z) + U(z)J) + z^{-2(mM+m_1)}JU(z)J]h$$

where $$U(z) = e(z)e^t(z) = \begin{pmatrix} 1 \\ z^{-1} \\ \cdot \\ \cdot \\ z^{-(mM+m_1-1)} \end{pmatrix} (1 z^{-1} \ldots z^{-(mM-m_1-1)}) \quad (19)$$

$$= \sum_{n=0}^{2mM+2m_1-2} z^{-n} S_n.$$

Note that the matrices $S_n$, in (19) are constant matrices with elements 0 and 1. It can be verified that $$[S_n]_{k,l} = \begin{cases} 1, & k+l = n \\ 0, & \text{otherwise.} \end{cases} \quad (20)$$

Substituting (19) into (18) the following expression for G (z) results:

$$G(z) = \sum_{n=0}^{4mM+4m_1-2} g(n) z^{-n} = \quad (21)$$

$$h^t \left[ \sum_{n=0}^{2mM+2m_1-2} z^{-n} S_n + z^{-(2mM+2m_1)} J \sum_{n=0}^{2mM+2m_1-2} z^{-n} S_n J + \right.$$

$$\left. z^{-(nM+m_1)} \left( J \sum_{n=0}^{2mM+2m_1-2} z^{-n} S_n + \sum_{n=0}^{2mM+2m_1-2} z^{-n} S_n J \right) \right] h.$$

By grouping like powers of $z^{-1}$, equation (21) becomes:

$$G(z) = h^t \Biggl\{ \sum_{n=0}^{mM+m_1-1} z^{-n} S_n +$$

$$\sum_{n=mM+m_1}^{2mM+2m_1-2} z^{-n}(S_n + JS_{n-mM-m_1} + S_{n-mM-m_1}J) +$$

$$z^{-(2mM+2m_1-1)}(JS_{mM+m_1-1} + S_{mM+m_1-1}J) +$$

$$\sum_{n=2mM+2m_1}^{3mM+3m_1-2} z^{-n}(JS_{n-mM-m_1} + S_{n-mM-m_1}J) +$$

$$JS_{n-2mM-2m_1} J) + \sum_{n=3mM+3m_1-1}^{4mM+4m_1-2} z^{-n} JS_{n-2mM-2m_1}J \Biggr\} h$$

which simplifies to:

$$G(z) = h^t \left( \sum_{n=0}^{4mM+4m_1-2} z^{-n} D_n \right) h \quad (22)$$

where $D_n$ depends on $S_n$ and $J$ as follows:

$$D_n = \begin{cases} S_n \\ S_n + JS_{n-mM-m_1} + S_{n-mM-m_1}J \\ JS_{mM+m_1-1} + S_{mM+m_1-1}J \\ 0 \leq n \leq mM + m_1 - 1 \\ mM + m_1 \leq n \leq 2(mM + m_1 - 1) \\ n = 2(mM + m_1) - 1 \\ \\ JS_{n-nM-m_1} + S_{n-mM-m_1}J + JS_{n-2mM-2m_1}J \\ JS_{n-2mM-2m_1}J \\ 2(mM + m_1) \leq n \leq 3(mM + m_1) - 2 \\ 3(mM + m_1) - 1 \leq n \leq 4(mM + m_1) - 2. \end{cases} \quad (23)$$

The objective is to find h such that $G(z)$ is a $2M^{th}$ band filter, i.e.

$$g_n = \begin{cases} 0; & n = 2(mM + m_1) - 1 - 2lM, \\ \begin{cases} 1 \leq l \leq m - 1, m_1 = 0 \\ 1 \leq l \leq m, \quad m_1 \neq 0 \end{cases} \\ \frac{1}{2M}; & n = 2(mM + m_1) - 1. \end{cases} \quad (24)$$

Equating the terms with the same power of $z^{-1}$ in (21) and using (23) and (24), the following m constraints on h are obtained:

$$\begin{cases} h^t S_n h = 0; \begin{cases} \lfloor \frac{(m+1)}{2} \rfloor \leq l \leq (m-1), m_1 = 0 \\ \lfloor \frac{(m+1)}{2} \rfloor \leq l \leq m, m_1 \neq 0 \end{cases} \\ h^t(S_n + JS_{n-mM-m_1} + S_{n-mM-m_1}J) h = 0; \\ 1 \leq l \leq \lfloor \frac{(m+1)}{2} \rfloor - 1 \\ h^t(JS_{mM+m_1-1} + S_{mM+m_1-1}J) h = \frac{1}{2M} \end{cases} \quad (25)$$

where $n = 2M(m-1) + 2m_1 - 1$, and $\lfloor x \rfloor$ is the greatest integer less than x. The notation $\lfloor x \rfloor$ is well known in the art for denoting the largest integer that is less than x; for example, $3 = \lfloor 3.5 \rfloor$.

In summary, for even N, given m, $m_1$ and M, one can calculate $S_n$ as in equation (20) above. The $2M^{th}$ band constraint on $G(z)$ becomes the constraints on h as shown in equation (25) above for even N. Suppose that one is able to obtain h such that h satisfies the constraints in equation (25) for even N. Then the resulting prototype filter $H(z)$ found using equation (16) above is a spectral factor of the $2M^{th}$ band filter $G(z)$, and further, the linear-phase property of $H(z)$ is structurally imposed on the problem, so the above method finds a spectral factor of a $2M^{th}$ band filter without taking the spectral factor.

Besides the above m constraints for even N, h should also yield a prototype filter with good stopband attenuation, i.e., h should minimize the stopband error:

$$\int_{\omega_S}^{\pi} |H(e^{j\omega})|^2 d\omega \tag{26}$$

and also satisfy equation (18) above. The eigenfilter method as shown in P. P. Vaidyanathan and T. Q. Nguyen, "Eigenfilters: A New Approach to Least Squares FIR Filter Design and Applications Including Nyquist Filters," IEEE TRANS. CAS, vol. 34, pp. 11–23, Jan. 1987; and in T. Q. Nguyen, "Eigenfilter for the Design of Linear-Phase Filters with Arbitrary Magnitude Response", IEEE CONF. ASSP, Toronto, Canada, pp. 1981–1984, May 1991; may be used to represent equation (26) as a quadratic form, as follows: the stopband error of $H(z)$ is defined to be $$e_S = \sum_{i=1}^{K} \beta_i \int_{\omega_{i,1}}^{\omega_{i,2}} |H(e^{j\omega})|^2 d\omega = \sum_{i=1}^{K} \beta_i \int_{\omega_{i,1}}^{\omega_{i,2}} H(e^{j\omega})H^*(e^{j\omega}) d\omega$$

where K is the number of stopbands, $\beta_i$ are their relative weighting, and $\omega_{i,1}$ and $\omega_{i,2}$ are the bandedges of these stopbands. For even N, $\rho_s$ may be expressed in a quadratic form, since, by substituting equation (17) and simplifying, one obtains the quadratic form $$\rho_s = h^t P h$$

where $$P = \sum_{i=1}^{K} \beta_i \int_{\omega_{i,1}}^{\omega_{i,2}} (e(e^{j\omega})\tilde{e}(e^{j\omega}) + e^{-j(mM+m_1)\omega} J e(e^{j\omega})\tilde{e}(e^{j\omega}) +$$

$$e^{j(mM+m_1)\omega} e(e^{j\omega})\tilde{e}(e^{j\omega}) J + J e(e^{j\omega})\tilde{e}(e^{j\omega}) J) d\omega$$

where P is a real, symmetric and positive definite matrix, with the elements $$P_{k,l} = 2 \sum_{i=1}^{K} \beta_i \int_{\omega_{i,1}}^{\omega_{i,2}} [\cos\omega(k-l) + \cos\omega(N-1-k-l)] d\omega, \tag{27}$$

$$0 \leq k,l \leq mM + m_1 - 1.$$

The notation $P_{k,l}$ denotes the (k,l) element of the matrix P.

Thus, given N even and $\omega_s$, one can compute P from equation (27) above, and equation (25) becomes:

$$\int_{\omega_S}^{\pi} |H(e^{j\omega})|^2 d\omega = h^t P h. \tag{28}$$

Therefore, the present invention requires finding h such that $h^t P h$ is minimized and satisfies (25), which may be accomplished very accurately by the nonlinearly constrained minimization algorithm of K. Schittkowski, "On the Convergence of a Sequential Quadratic Programing Method with an Augmented Lagrangian Line Search Function," Mathematik Operationsforschung und Statistik, Serie Optimization, 14, pp. 197–216, 1983; and also K. Schittkowski, "NLPQL: A FORTRAN Subroutine Solving Constrained Nonlinear Programming Problems, (edited by Clyde L. Monma), Annals of Operations Research, 5, pp. 488–500, 1986. This minimization algorithm is coded in the IMSL Math Library, the mathematics subroutine package, under subroutine DNOOF. The DNOONF subroutine is used to generate all examples in this application.

The Implementation for Odd N

In this section, the implementation of the present invention is disclosed for the odd N case, i.e., $N = 2(mM + m_1) + 1$ where $0 \leq m_1 \leq M - 1$. Except for some modifications, the formulations for odd N are very similar to those for even N. Defining h and e(z) as follows:

$$\begin{cases} h = [h(0) h(1) \ldots h(mM + m_1)]^t, \\ e(z) = [1 \, z^{-1} \ldots z^{-(mM+m_1)}]^t, \end{cases} \tag{29}$$

then the prototype filter $H(z)$ can be represented as $$H(z) = \sum_{n=0}^{N-1} h(n) z^{-n} = h^t V(IJ) \begin{pmatrix} e(z) \\ z^{-(mM+m_1)} e(z) \end{pmatrix}$$

where the dimensions of both I and J are $(mM + m_1 + 1) \times (mM + m_1 + 1)$.

Using the above notation, the corresponding $2M^{th}$ band filter $G(z)$ is:

$$G(z) = \sum_{n=0}^{4mM+4m_1} g(n) z^{-n} = H^2(z) =$$

$$h^t V(IJ) \begin{pmatrix} e(z) \\ z^{-(mM+m_1)} e(z) \end{pmatrix} (e^t(z) \, z^{-(mM+m_1)} e^t(z)) \begin{pmatrix} I \\ J \end{pmatrix} V h =$$

$$h^t V[U(z) + z^{-(mM+m_1)}(JU(z) + U(z)J) + z^{-2(mM+m_1)} JU(z)] V h$$

where $U(z)$ is as in (19). Consequently, similar to the calculations for even N, $G(z)$ can be expressed for odd N as follows:

$$G(z) = \sum_{n=0}^{4mM+4m_1} g(n) z^{-n} = h^t V \left( \sum_{n=0}^{4mM+4m_1} z^{-n} D_n \right) V h \tag{30}$$

where $D_n$ depends on $S_n$ and J as follows:

$$D_n = \begin{cases} V S_n V, \\ V(S_n + J S_{n-mM-m_1} + S_{n-mM-m_1} J) V, \\ V(S_{2mM+2m_1} + J S_{mM+m_1} + S_{mM+m_1} J + J S_0 J) V, \\ 0 \leq n \leq mM + m_1 - 1 \\ mM + m_1 \leq n \leq 2(mM + m_1 - 1) \\ n = 2(mM + m_1) \\ \\ V(J S_{n-mM-m_1} + S_{n-mM-m_1} J + J S_{n-2mM-2m_1} J) V, \\ V J S_{n-2mM-2m_1} J V, \\ 2(mM + m_1) + 1 \leq n \leq 3(mM + m_1) \\ 3(mM + m_1) + 1 \leq n \leq 4(mM + m_1). \end{cases} \tag{31}$$

The objective is to find h such that $G(z)$ is a $2M^{th}$ band filter, i.e., $$g_n = \begin{cases} 0 & ; \; n = 2(mM + m_1) - 2lM, \; 1 \leq l \leq m \\ \dfrac{1}{2M} & ; \; n = 2(mM + m_1). \end{cases} \quad (32)$$

Equating the terms with the same power of $z^{-1}$ in (30) and using (30) and (31), the following m constraints on h are obtained:

$$\begin{cases} h^t V S_n V h = 0; \; \left\lfloor \dfrac{m}{2} + 1 \right\rfloor \leq l \leq m \\ h^t V (S_n + J S_{n-mM-m_1} + S_{n-mM-m_1} J) V h = 0; \\ 1 \leq l \leq \left\lfloor \dfrac{m}{2} \right\rfloor \\ h^t V (S_{2mM+2m_1} + J S_{mM+m_1} + S_{mM+m_1} J + J S_0 J) V h = \dfrac{1}{2M} \end{cases} \quad (33)$$

where $n = 2M(m-l) + 2m_1$, and $\lfloor x \rfloor$ is the greatest integer less than x.

Similar to the quadratic constraints (25) for even N, the conditions in (32) are another form of the $2M^{th}$ band constraint on G(z). Using the similar eigenfilter formulation as above, the odd N case requires finding h that minimizes the stopband error of H(z) defined as $$e_S = \sum_{i=1}^{K} \beta_i \int_{\omega_{i,1}}^{\omega_{i,2}} |H(e^{j\omega})|^2 d\omega = \sum_{i=1}^{K} \beta_i \int_{\omega_{i,1}}^{\omega_{i,2}} H(e^{j\omega}) H^*(e^{j\omega}) d\omega \quad (35)$$

where K is the number of stopbands, $\beta_i$ are their relative weighting, and $\omega_{i,1}$ and $\omega_{i,2}$ are the bandedges of these stopbands. For odd N, $\rho_s$ may be expressed in a quadratic form, since, by substituting equation (29) and simplifying, one obtains:

$$\rho_s = h^t P h$$

where P is a real, symmetric and positive definite matrix, with the elements $$[P]_{k,l} = \quad (34)$$

$$2\nu \sum_{i=1}^{K} \beta_i \int_{\omega_{i,1}}^{\omega_{i,2}} [\cos\omega(k-l) + \cos\omega(N-1-k-l)] d\omega,$$

$$0 \leq k, l \leq mM + m_1$$

with K is the number of stopbands of $H(e^{j\omega})$, $\beta_i$ are their relative weights and $\omega_{i,1}$ and $\omega_{i,2}$ are the bandedges of these stopbands, and $$\nu = \begin{cases} 1, \; 0 \leq k, l \leq mM + m_1 - 1 \\ \dfrac{1}{2}, \; k = mM + m_1, \; 0 \leq l \leq mM + m_1 - 1 \\ \dfrac{1}{2}, \; l = mM + m_1, \; 0 \leq k \leq mM + m_1 - 1 \\ \dfrac{1}{4}, \; k = l = mM + m_1. \end{cases}$$

Thus, given N odd and $\omega_s$, one can compute P from equation (34) above, and one obtains:

$$\int_{\omega_S}^{\pi} |H(e^{j\omega})|^2 d\omega = h^t P h.$$

Therefore, the present invention requires finding h such that $h^t P h$ is minimized and satisfies (33), which may be accomplished very accurately by the aforesaid nonlinearly constrained minimization algorithm of K. Schittkowski. This minimization algorithm is coded in the IMSL Math Library, the mathematics subroutine package, under subroutine DNOONF. The DNOONF subroutine is used to generate all examples in this application.

General Formulation

For a perfect reconstruction lossless filter bank, equation (1) simplifies to:

$$\begin{pmatrix} H_0(z) & H_1(z) & \cdots & H_{M-1}(z) \\ H_0(zQ) & H_1(zQ) & \cdots & H_{M-1}(zQ) \\ \cdot & \cdot & & \cdot \\ \cdot & \cdot & \cdot & \cdot \\ \cdot & \cdot & & \cdot \\ H_0(zQ^{M-1}) & H_1(zQ^{M-1}) & \cdots & H_{M-1}(zQ^{M-1}) \end{pmatrix} \begin{pmatrix} H_0(z) \\ H_1(z) \\ \cdot \\ \cdot \\ \cdot \\ H_{4M-1}(z) \end{pmatrix} = \begin{pmatrix} z^{-n_0} \\ 0 \\ \cdot \\ \cdot \\ \cdot \\ 0 \end{pmatrix} \quad (35)$$

where $Q = e^{j2\pi/M}$, and where the parameters to be found are the coefficients of $H_k(z)$. Let h be a vector consisting of all the filter coefficients $h_k(n)$, $0 \leq k \leq M-1$, $0 \leq n \leq N-1$, i.e. $h = [h_0(0) \ldots h_0(N-1), h_1(0) \ldots h_1(N-1) \ldots h_{M-1}(N-1)]^t$.

Then equation (35) can be written in the following form:

$$\begin{cases} h^t Q_k h = 0, \\ h^t S_k h = 1 \end{cases} \quad (36)$$

where $Q_k$ and $S_k$ depend on the filter bank parameters. The cost function $\Phi$ in equation (2) may be expressed as a quadratic form in h, i.e.

$$\Phi = h^t P h \quad (37)$$

where P is a real, symmetric and positive-definite matrix, as shown in T. Nguyen, "The Eigenfilter for the Design of Linear-Phase Filter with Arbitrary Magnitude Response," PROC. IEEE INT. CONF. ASSP, Toronto, Canada, May 1991, pp. 1981-4. Combining equations (36) and (37), the optimized filter $H_k(z)$ is precisely $h_{opt}$ such that:

$$h_{opt} = Min_h h^t Ph \text{ subject to } \begin{cases} h^t Q_k h = 0, \\ h^t S_k h = 1. \end{cases} \quad (38)$$

In summary, the construction of the filter banks is formulated by a least squares optimization method with quadratic constraints as in equation (38). Since $Q_k$ is normally not positive definite, it is usually difficult to solve the minimization of $h^t Ph$. However, optimization procedures may be used, such as procedures found in the IMSL Math Library, which approximately solve equation (38) by linearizing the quadratic constraints. The optimization procedures yield an approximate solution, i.e. the constraints are not satisfies exactly, but the errors are very small and can be ignored in most practical cases. Further, the quadratic-constrained least-squares formulation rapidly converges to the approximate solution, since both the cost function $\Phi$ and the constraints in equation (38) are quadratic functions with respect to the unknown parameters. Such a quadratic-constrained least-squares formulation can be applied to formulating and constructing filter banks in general, including pseudo-QMF filter banks, perfect reconstruction filter banks, cosine-modulated filter banks, linear phase filter banks, and asymmetric cosine-modulated filter banks.

In most methods for constructing filters with good stopband attenuation, it is important to start the optimization process with a starting point sufficiently near the optimal solution, and further, the starting point does not have to possess the exact perfect reconstruction conditions as in equation (35). Therefore, the method of the present invention is also used to obtain initial values of $H_k(z)$.

Implementation of the Pseudo-QMF Banks

Figure 19:
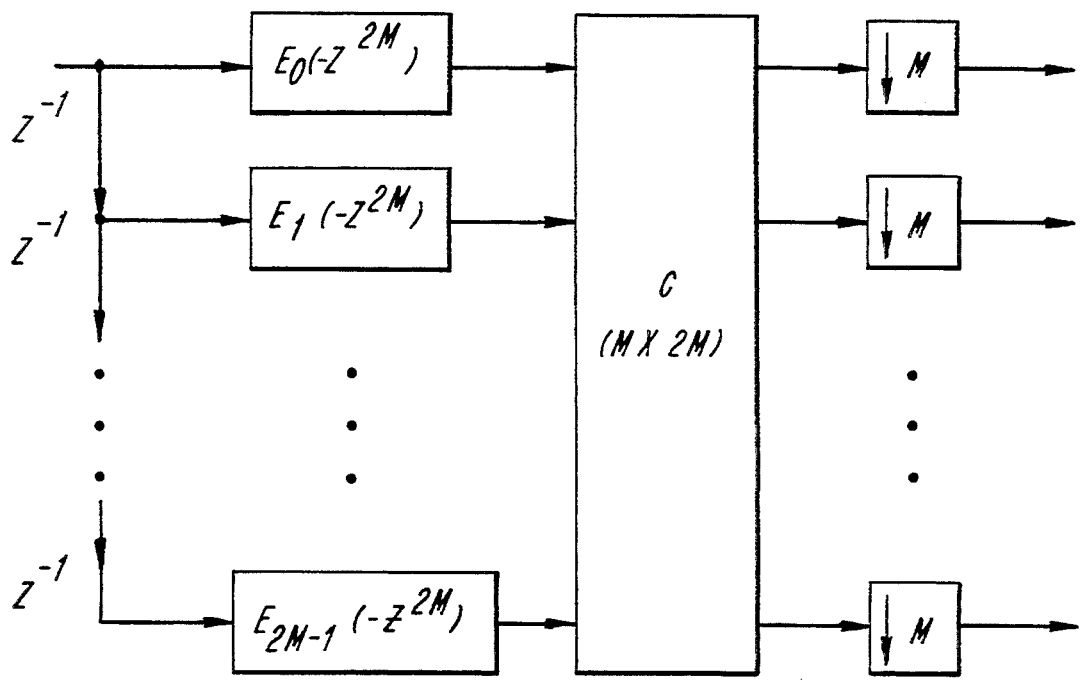
FIG. 19 illustrates a polyphase implementation of the decimated analysis bank of pseudo-QMF bank.

The exemplary arrangement of the pseudo-quadrature-mirror filter bank of the present invention shown in FIG. 1 may be embodied as a polyphase implementation of the decimated analysis bank of the pseudo-QMF bank coupled to the plurality of synthesis filter banks, as illustrated in FIG. 19.

In the preferred embodiment, the plurality of analysis filter banks and the plurality of synthesis filter banks each may be implemented using a cascade of 2M polyphase components of $H(z)$ and a 2M-point Discrete Cosine Transform (DCT), where the sequence of input signals $x(n)$ are buffered to form a set of 2M parallel paths using a delay chain with decimators coupled to the filter banks.

By defining $$c_{k,l} = 2\cos\left[ 2(k+1)\frac{\pi}{2M}(l - mM + 1/2) + \theta_k \right],$$

and using equation (3) above, the analysis filters $H_k(z)$ may be expressed as:

$$H_k(z) = \sum_{n=0}^{N_H-1} h_k(n) z^{-n} = \sum_{n=0}^{2mM-1} h(n) c_{k,l} z^{-n} \quad (39)$$

$$= \sum_{q=0}^{2M-1} \sum_{p=0}^{m-1} h(q + 2pM) c_{k,(q+2pM)} z^{-(q+2pM)}$$

-continued
$$= \sum_{q=0}^{2M-1} z^{-q} c_{k,q} \sum_{p=0}^{m-1} (-1)^p h(q + 2pM) z^{-2pM}$$

$$= \sum_{q=0}^{2M-1} c_{k,q} z^{-q} E_q(-z^{2M})$$

using $$c_{k,(l+2pM)} = (-1)^p c_{k,l}$$

due to the periodicity of the cosine modulation.

Consequently, the analysis filter bank can be expressed in matrix form as $$\begin{pmatrix} H_0(z) \\ H_1(z) \\ \vdots \\ H_{M-1}(z) \end{pmatrix} = C \begin{pmatrix} E_0(-z^{2M}) \\ z^{-1} E_1(-z^{2M}) \\ \vdots \\ z^{-(2M-1)} E_{2M-1}(-z^{2M}) \end{pmatrix}$$

where C is a M×2M cosine-modulation matrix and $[C]_{k,l} = C_{k,l}, 0 \leq k \leq M-1, 0 \leq l \leq 2M-1$ and $E_k(z)$ are the 2M polyphase functions of the prototype filter $H(z)$, as shown in FIG. 19.

Figure 20:
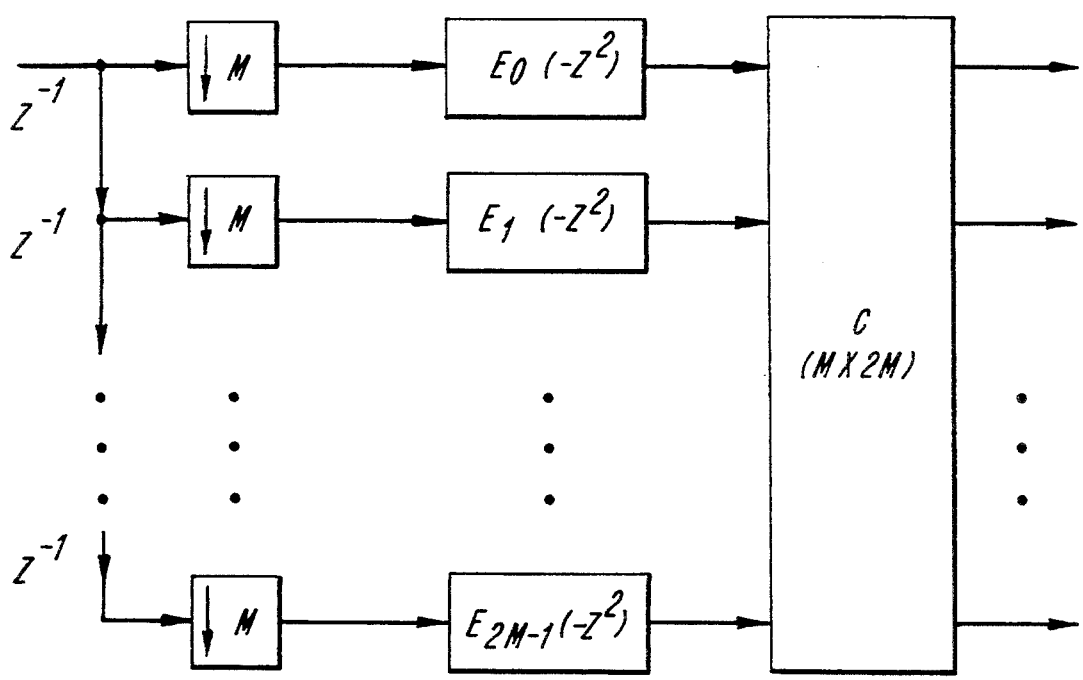
FIG. 20 illustrates an equivalent block diagram of the implementation of FIG. 19.

An equivalent embodiment of the pseudo-quadrature-mirror filter bank of the present invention show in FIG. 1 may include a set of decimators with outputs coupled to the inputs of the filters $E_k(z)$ of the prototype filter $H(z)$, with the filtered sequences passed into the cosine-modulation block C, as illustrated in FIG. 20, with the output of C being the subband (channelized) spectrum of the original spectrum.

As illustrated in FIG. 21, an embodiment of the present invention includes using an implementation of a 2M point Discrete Cosine Transform (DCT) using a 2M-point Discrete Fourier Transform (DFT) is provided, where the time sequence $x(l)$ is scaled by a factor $\rho^{jl\pi/(2M)}$ before computing the 2M-point DFT, and the output of the DFT is scaled by:

$$e^{-j(k+1/2)(mM-1/2)\frac{\pi}{M} + j\theta_k}$$

and the real part of this sequence is the desired discrete cosine transform $X(k)$ of $x(l)$.

In a further example, illustrated in FIG. 22, an alternate embodiment of the present invention includes using an implementation of a 2M point DCT using an M-point DCT 40 and an M-point Discrete Sine Transform (DST) 42, where the time sequence $x(l)$, $0 \leq l \leq 2M-1$, is divided into two time sequences of M elements, as shown in FIG. 22. The discrete cosine transform $X(k)$ is:

$$X(k) = \sum_{l=0}^{2M-1} x(l) c_{k,l} = \sum_{l=0}^{M-1} x(l) c_{k,l} + \sum_{l=0}^{M-1} x(l+M) c_{k,l+M}$$

$$= \sum_{l=0}^{M-1} x(l) c_{k,l} -$$

$$(-1)^k \sum_{l=0}^{M-1} x(l+M) (-1)^{k+1} c_{k,l+M}$$

$$= X_0(k) - (-1)^k X_1(k).$$

As shown in FIG. 22, the calculation of $X_0(k)$ may be realized as M-point DCT 40, which may be further embodied as illustrated in FIGS. 23A and 24A, for even m and for odd m, respectively.

Similarly shown in FIG. 22, the calculation of $X_1(k)$ may be realized as M-point DST 42, which may be further embodied as illustrated in FIGS. 23B and 24B, for even m and for odd m, respectively.

EXAMPLE 1

Figure 5:
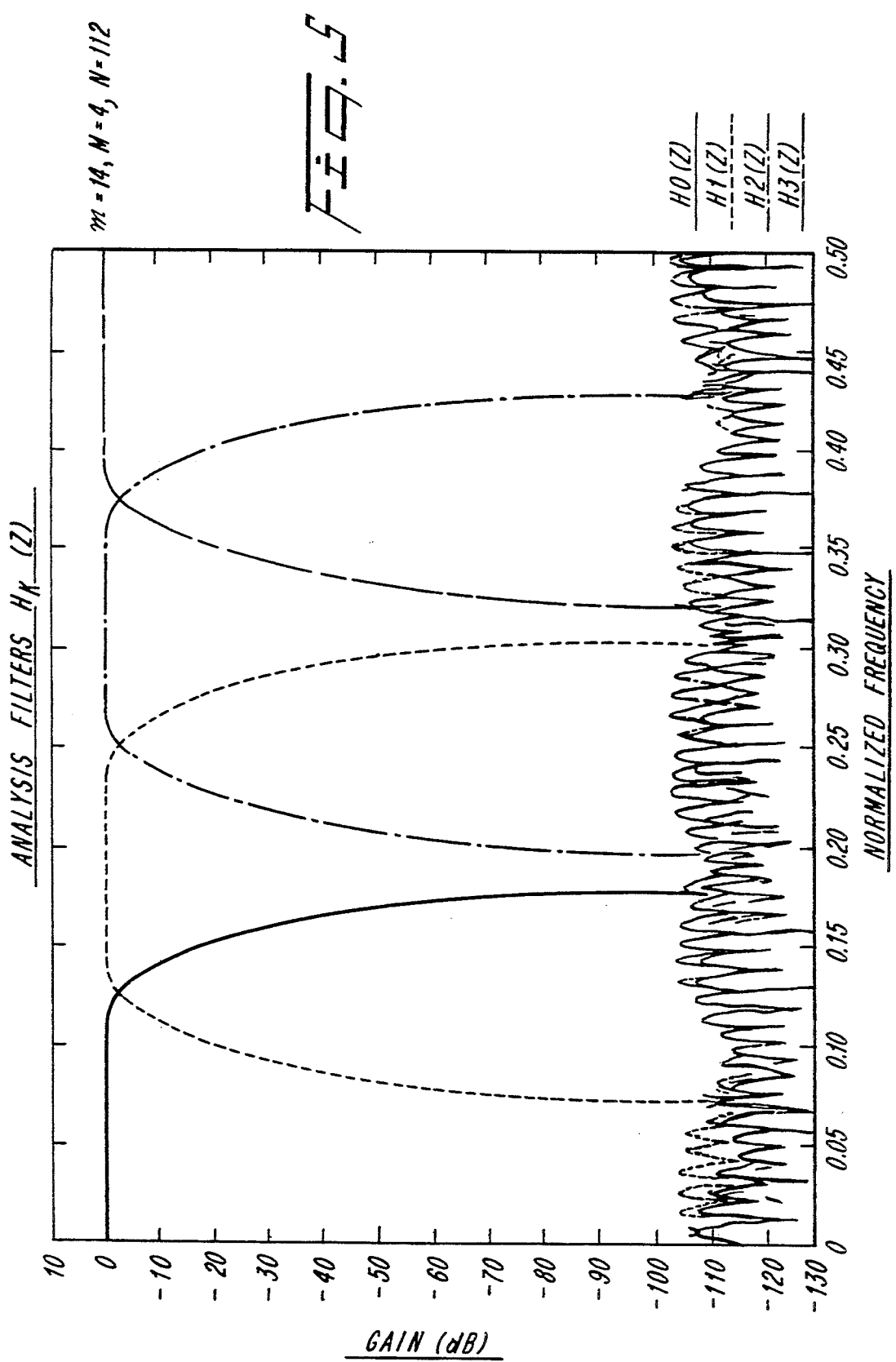
FIG. 5 shows magnitude response plots of analysis filters, $H_k(z)$, for the first example.
Figure 6:
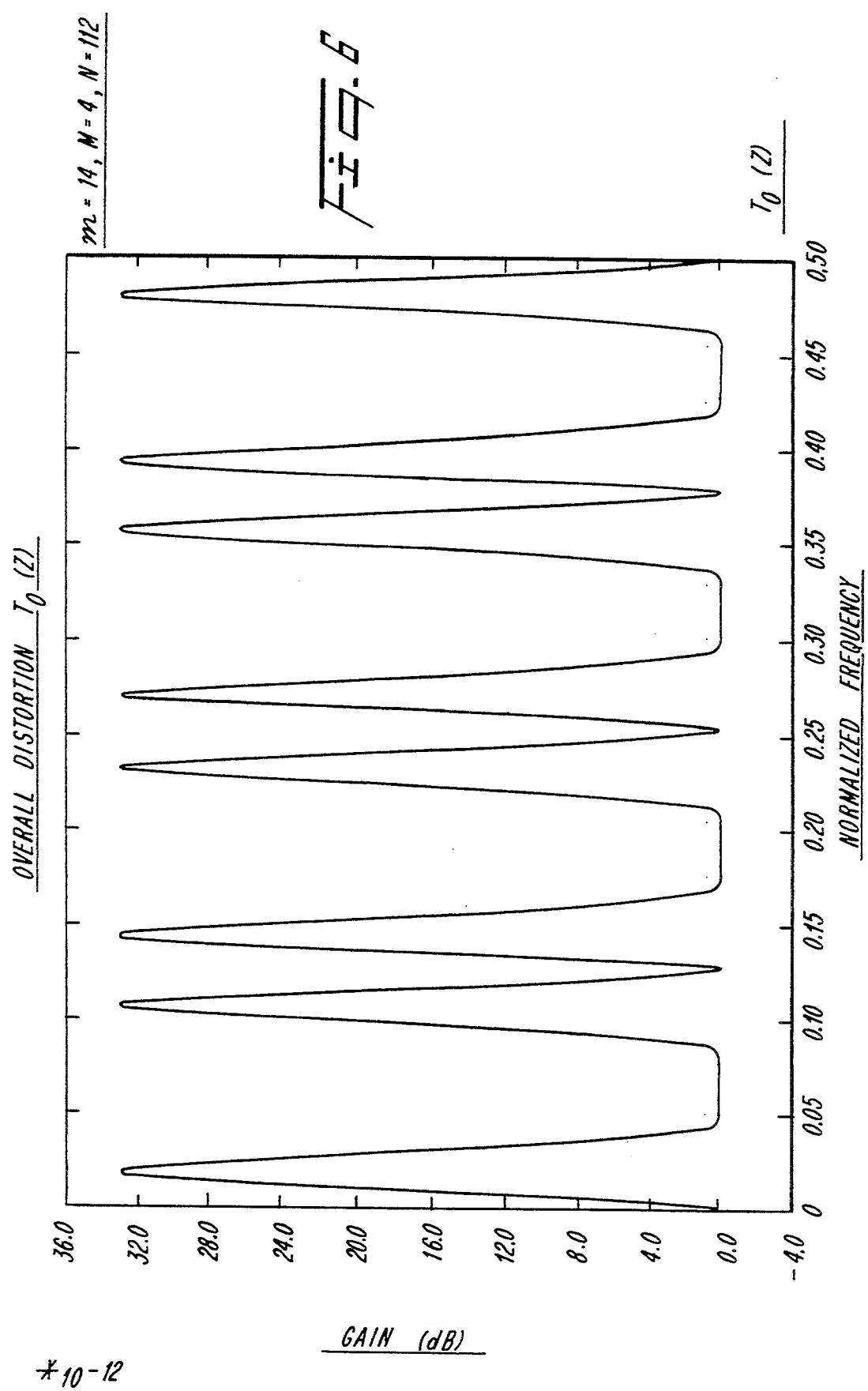
FIG. 6 shows a magnitude response plot for an overall distortion, $T_0(z)$, for the first example.
Figure 7:
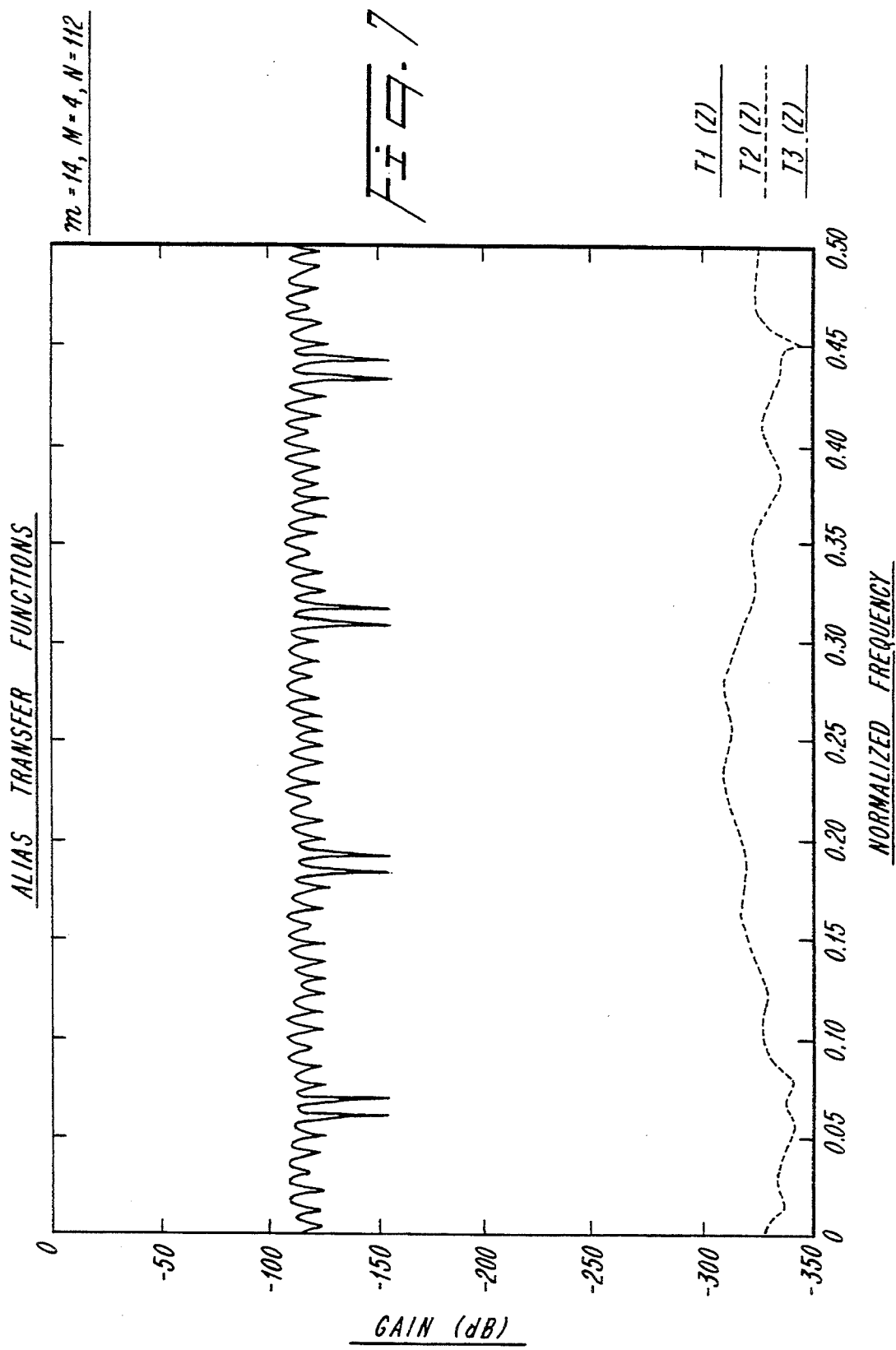
FIG. 7 shows magnitude response plots for alias transfer functions, $T_k(z)$, for the first example.
Figure 8:
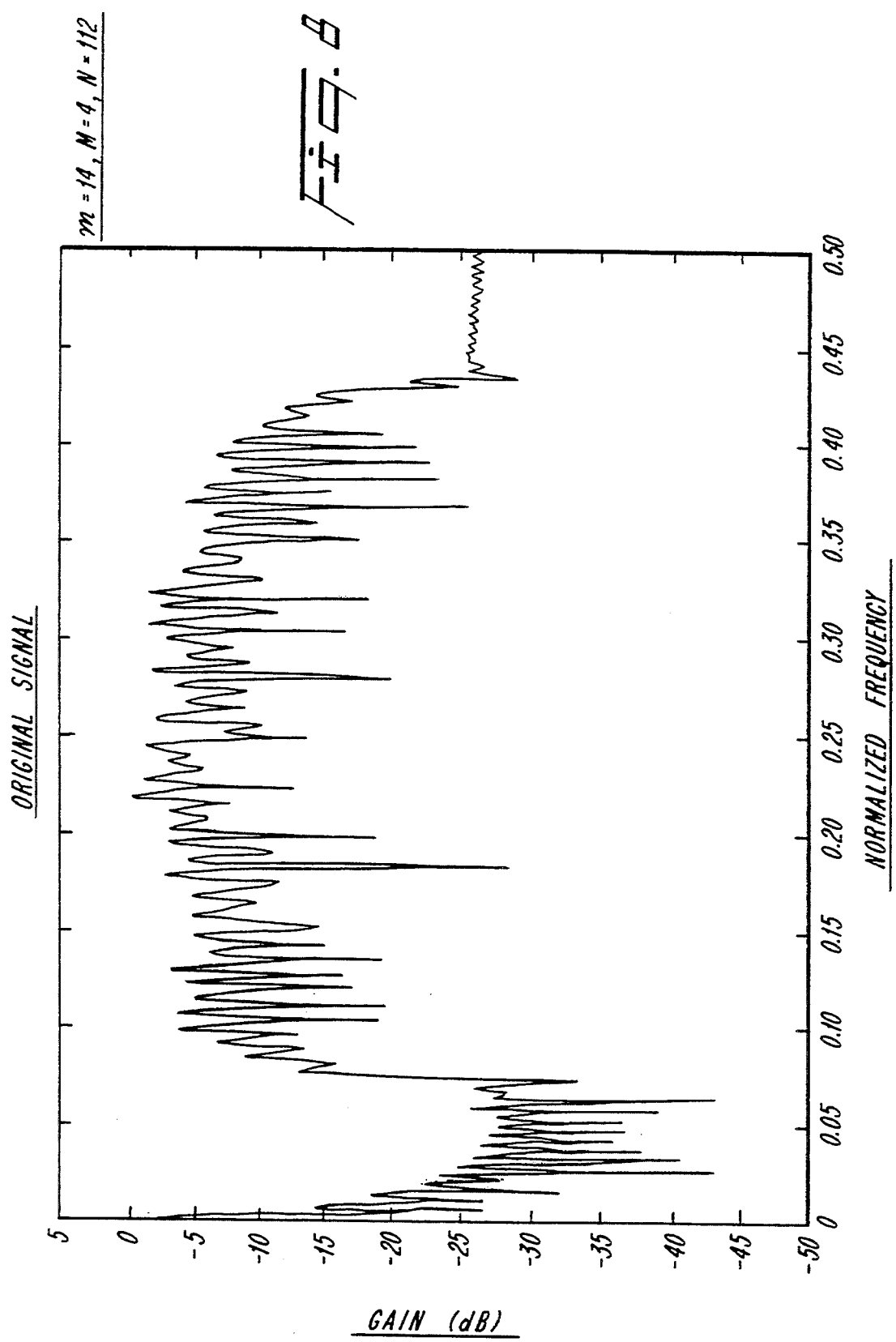
FIG. 8 shows a spectrum of an input signal for the first example.
Figure 9:
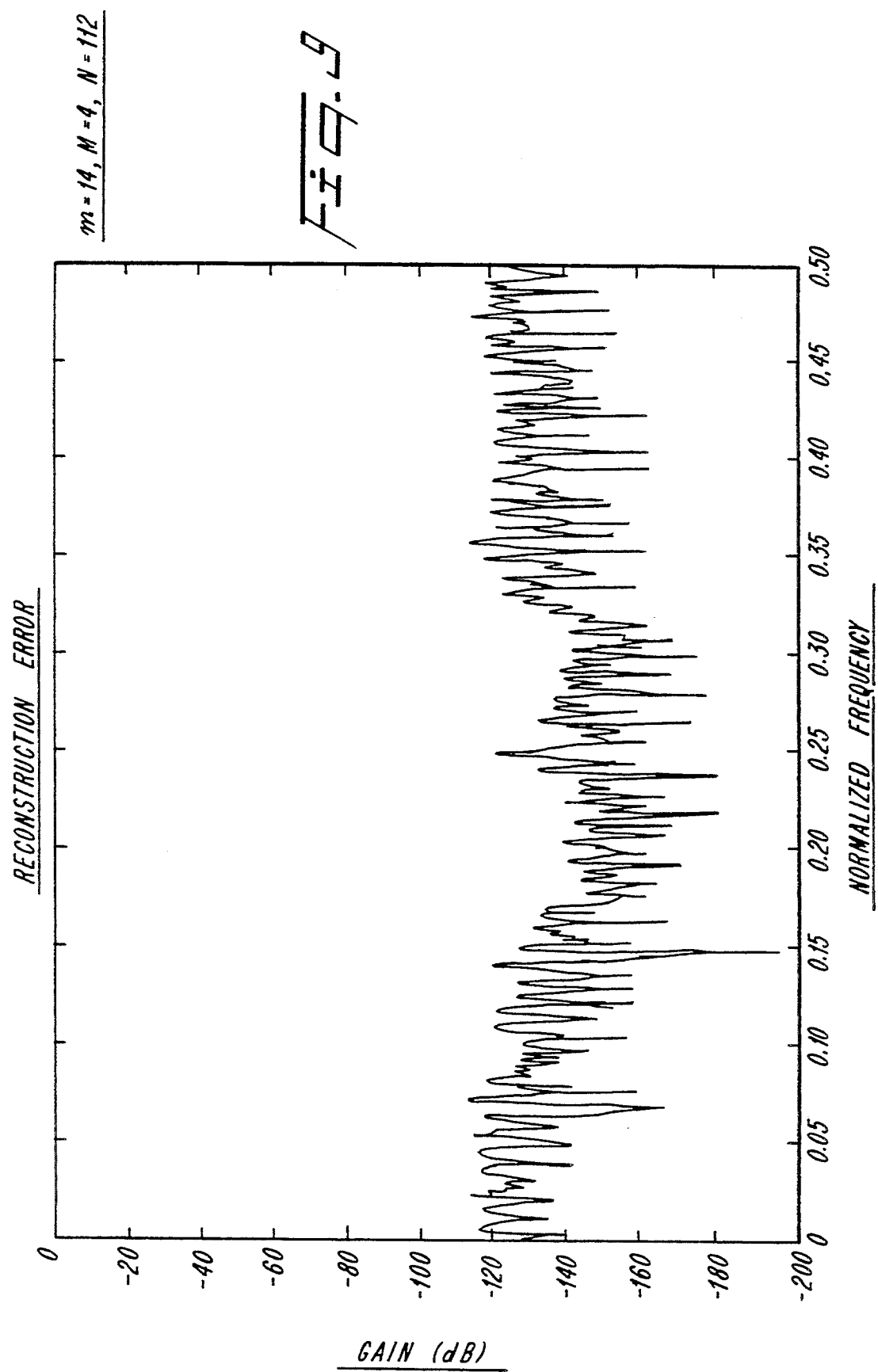
FIG. 9 shows a spectrum of reconstruction error for the first example.

In this example, a 4-channel pseudo-QMF bank is constructed using the above method. Let $m = 14$, $m_1 = 0$, $M = 4$, $K = 1$, $\beta_1 = 1$, $\omega_{1,1} = 0.23\pi$, $\omega_{1,2} = \pi$ and $\eta = 1 \times 10^{-13}$. The length of H(z) is chosen to be $N = 112$. P is computed using numerical integration with 400 grid points. The magnitude response of the optimized prototype filter H(z) are shown in FIG. 4, with the magnitude responses of the corresponding analysis filters $H_k(z)$ illustrated in FIG. 5. The magnitude responses of the overall distortion transfer function $T_0(z)$ and the aliasing transfer functions $T_l(z)$, $1 \leq l \leq M - 1$ are plotted in FIGS. 6-7, respectively. Note in FIGS. 4 and 5 that the stopband attenuation of H(z) and $H_k(z)$ is about $-107$ dB. Consequently, as shown in FIG. 5, the aliasing level is about $-107$ dB. The magnitude response of $T_0(z)$ is plotted in FIG. 6 on an expanded logarithmic scale. Here, $\delta_1 \leq 3.35 \times 10^{-11}$ dB, which is very small in normal scale. The above 4-channel pseudo-QMF bank was also simulated. The spectrum of the input signal and the reconstructed error are plotted in FIGS. 8 and 9, respectively. In agreement with the theory, the output signal $x(\tilde{n})$ approximates $x(n)$ with $-107$ dB error, as shown in comparing FIGS. 8 and 9.

EXAMPLE 2

Figure 10:
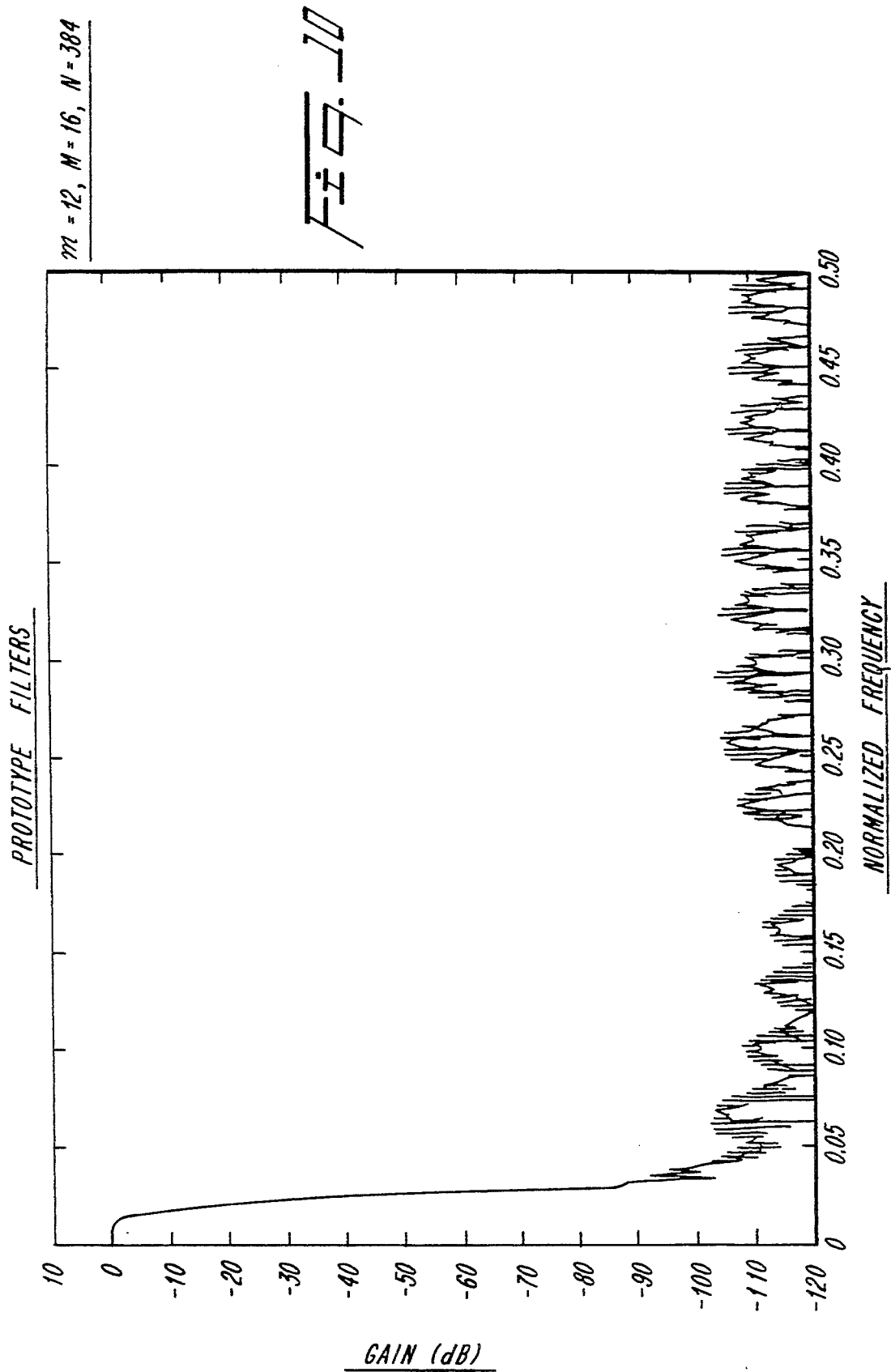
FIG. 10 shows a magnitude response of an optimized prototype filter, $H(z)$, for a second example.
Figure 11:
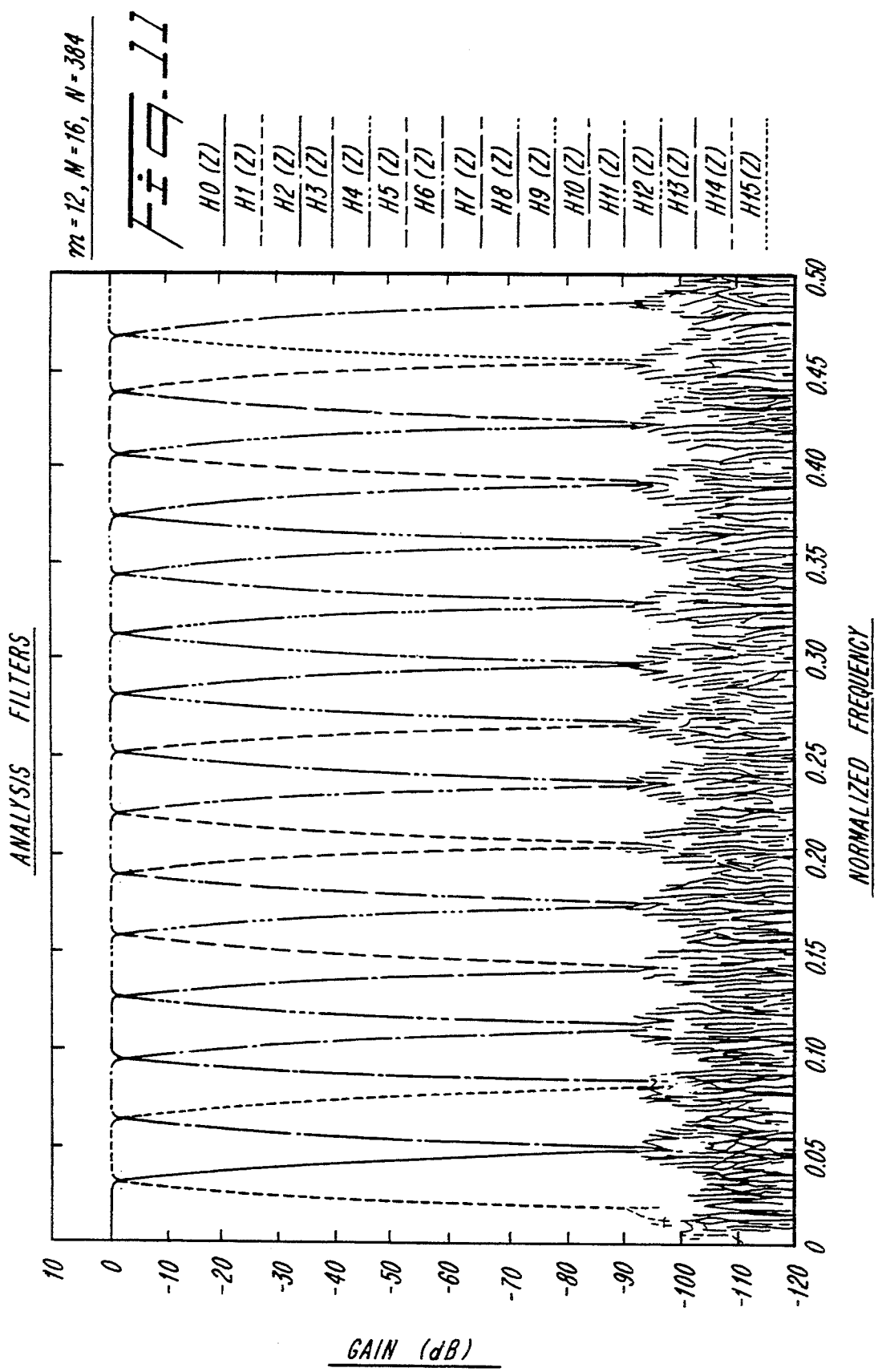
FIG. 11 shows magnitude response plots for the analysis filters, $H_k(z)$, for the second example.
Figure 12:
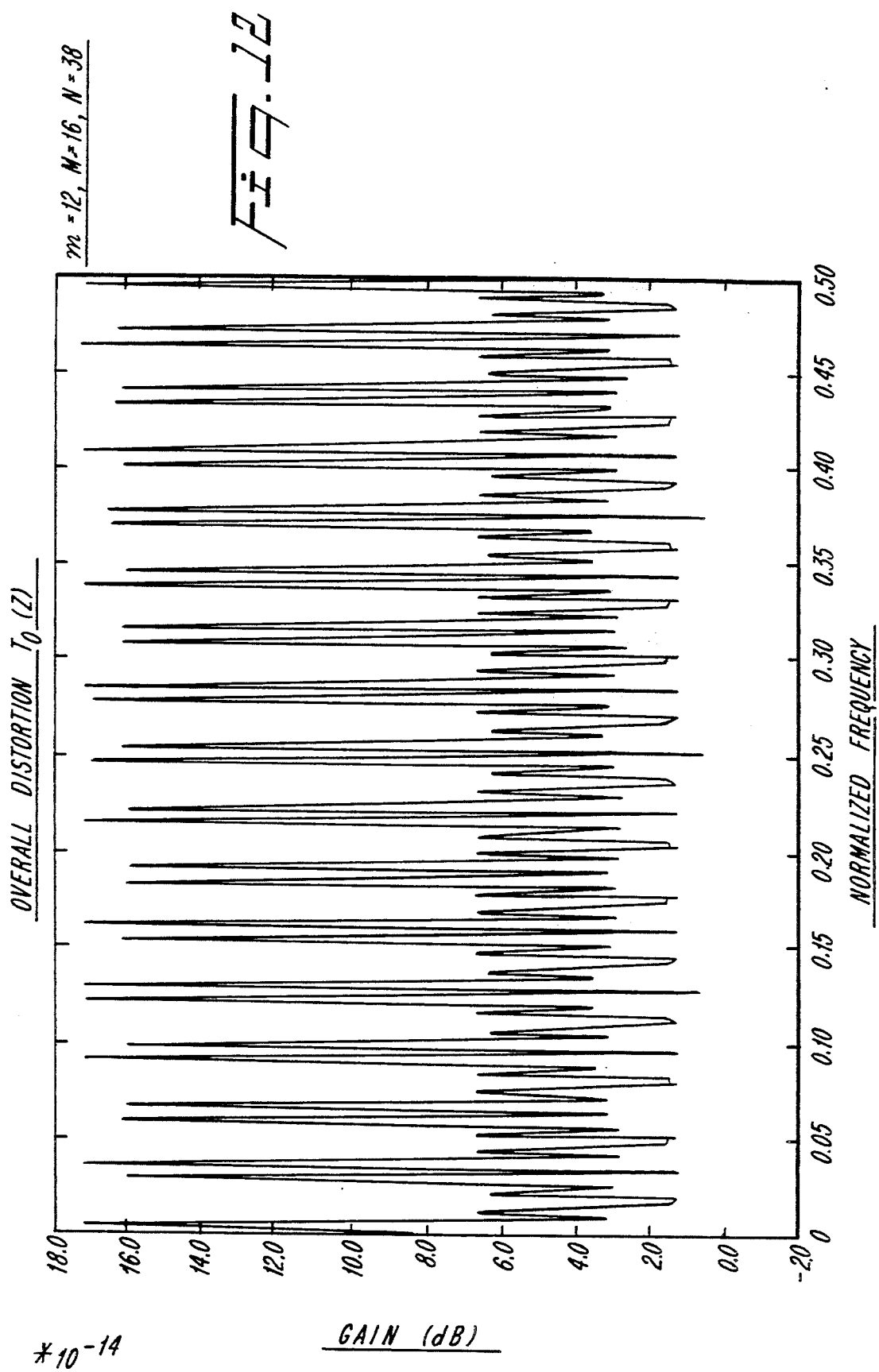
FIG. 12 shows the magnitude response plot for the overall distortion, $T_0(z)$, for the second example.
Figure 13:
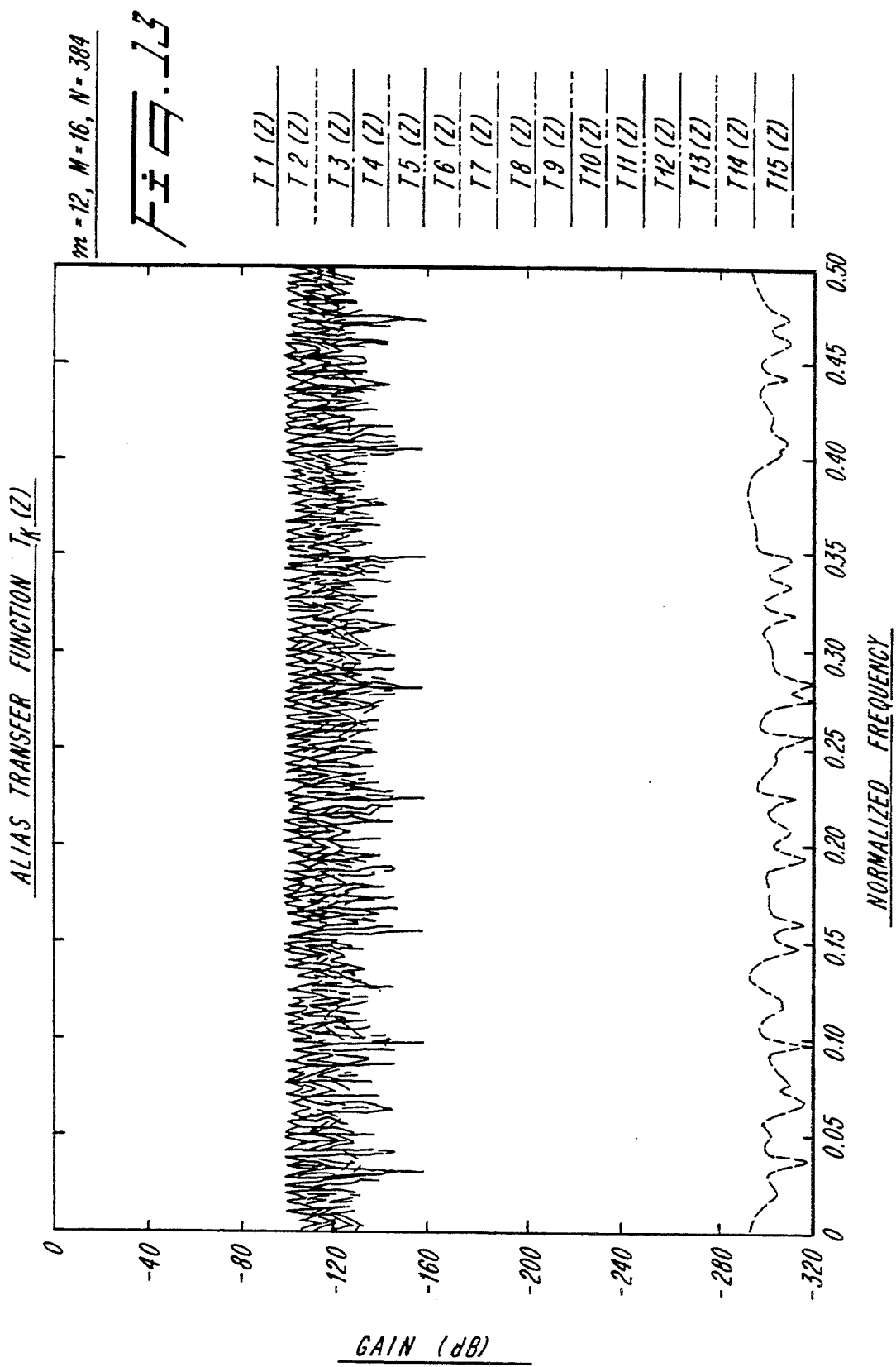
FIG. 13 shows the magnitude response plots for the alias transfer functions, $T_k(z)$, for the second example.
Figure 14:
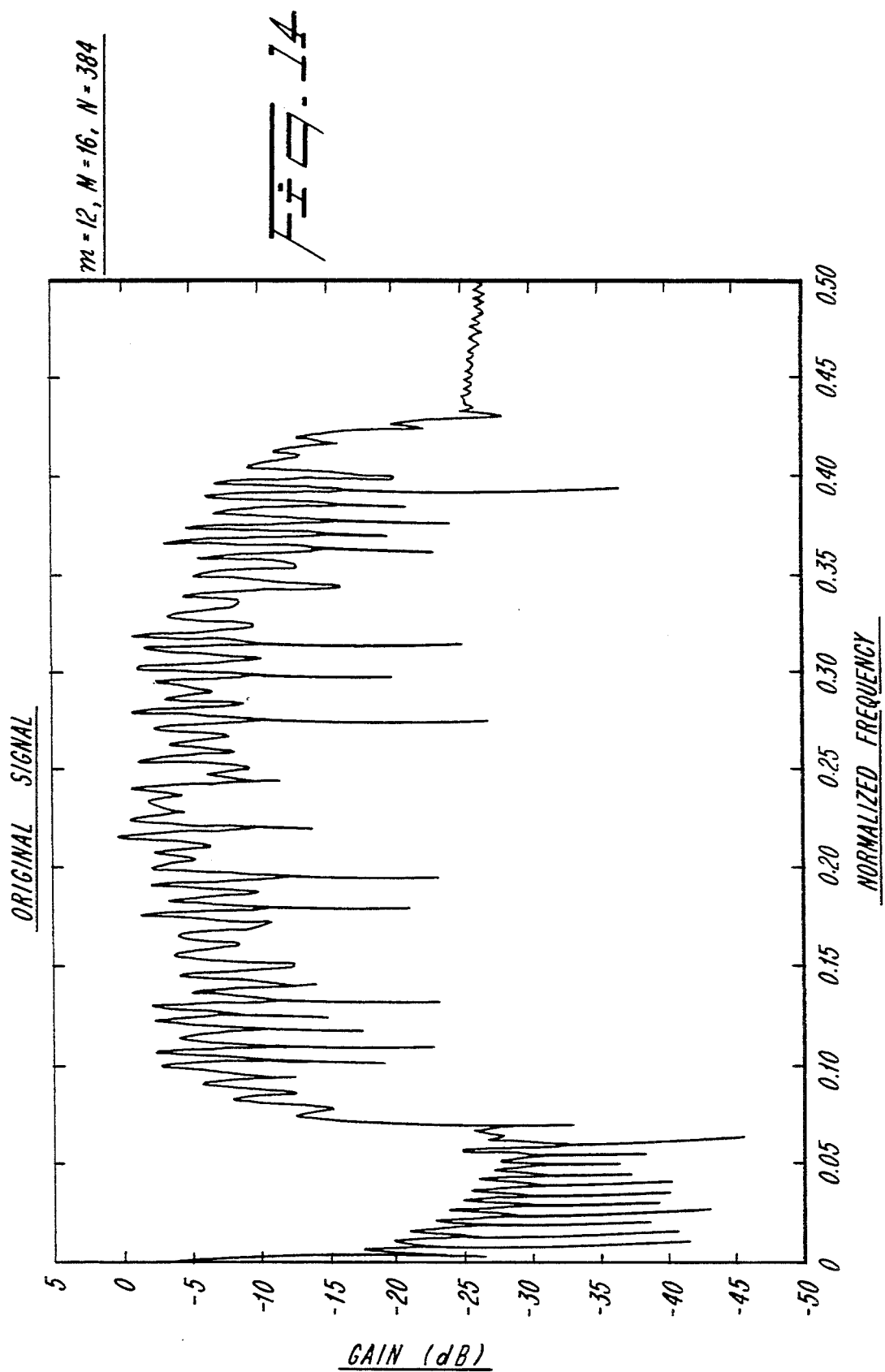
FIG. 14 shows a spectrum of an input signal for the second example.
Figure 15:
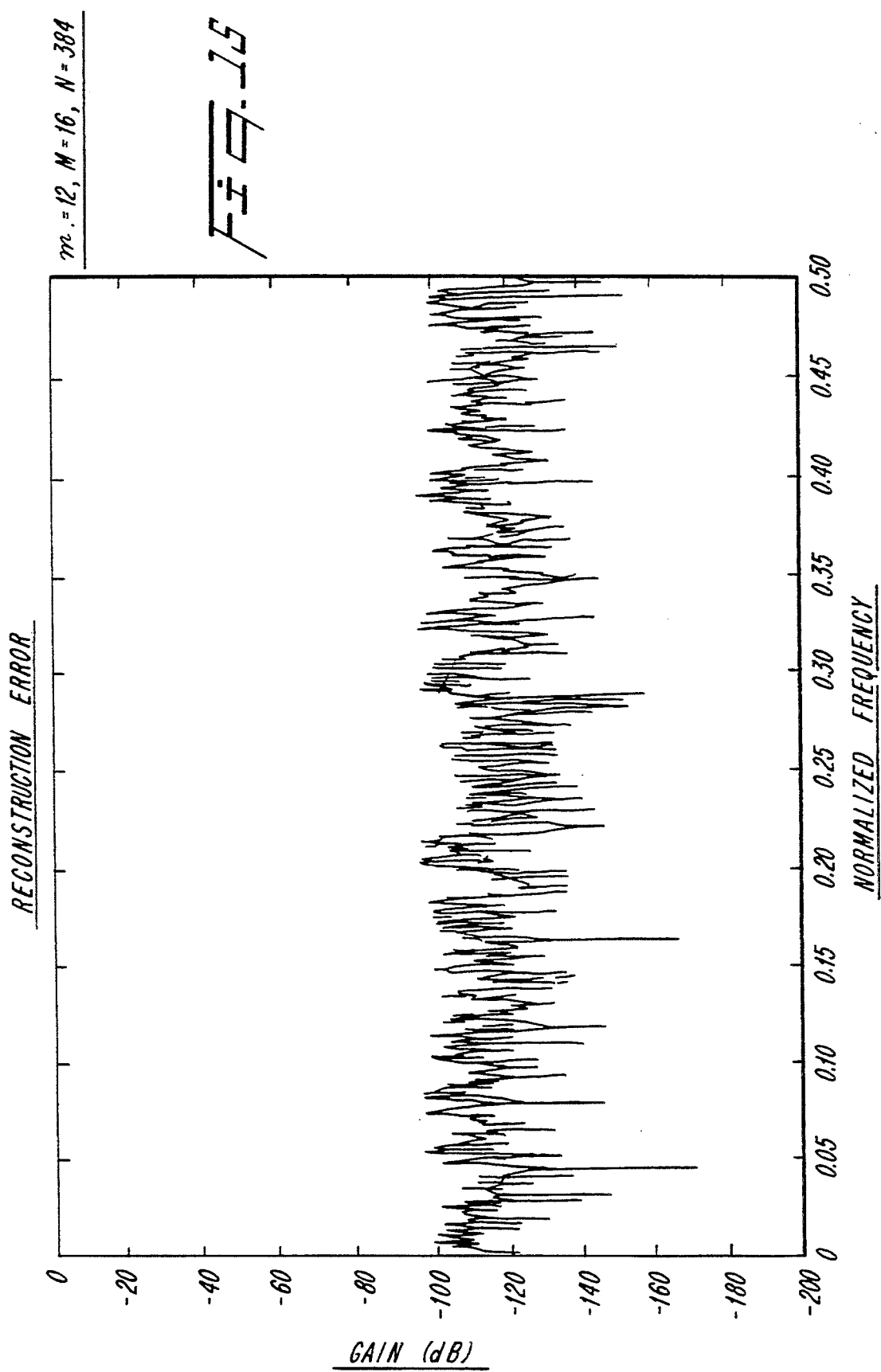
FIG. 15 shows the reconstruction error of the second example.

In this example, a 16-channel pseudo-QMF bank is constructed using the above method. Let $m = 12$, $m_1 = 0$, $M = 16$, $K = 2$, $\epsilon_1 = 1.2$, $\beta_2 = 1.0$, $\omega_{1,1} = 0.059\pi$, $\omega_{1,2} = 0.43\pi$, $\omega_{2,2} = \pi$ and $\eta = 1 \times 10^{-13}$. The length of H(z) is chosen to be $N = 384$. P is computed using numerical integration with 400 grid points. The magnitude response of the optimized prototype filter H(z) is shown in FIG. 10, with the magnitude responses of the corresponding analysis filters $H_k(z)$ illustrated in FIG. 11. The overall distortion transfer function $T_0(z)$ and the aliasing transfer functions $T_l(z)$, $1 \leq l \leq M - 1$ are plotted in FIGS. 12 and 13, respectively. Note in FIGS. 10 and 11 that the stopband attenuation of H(z) and $H_k(z)$ is about $-100$ dB, except at the bandedges. Consequently, as illustrated in FIG. 11, the aliasing level is also about $-95$ dB. The magnitude response of $T_0(z)$ is plotted in FIG. 12 on an expanded logarithmic scale. Here, $\delta_1 \leq 1.8 \times 10^{-13}$ dB, which is very small in normal scale. The above 16-channel pseudo-QMF bank is simulated with the same input signal as in Example 1. The spectrum of the input signal and the reconstructed error are plotted in FIGS. 14 and 15, respectively. Here, the signal $x(n)$ approximates $\hat{x}(n)$ with $-95$ dB error, as shown in comparing FIGS. 14 and 15.

EXAMPLE 3

Figure 16:
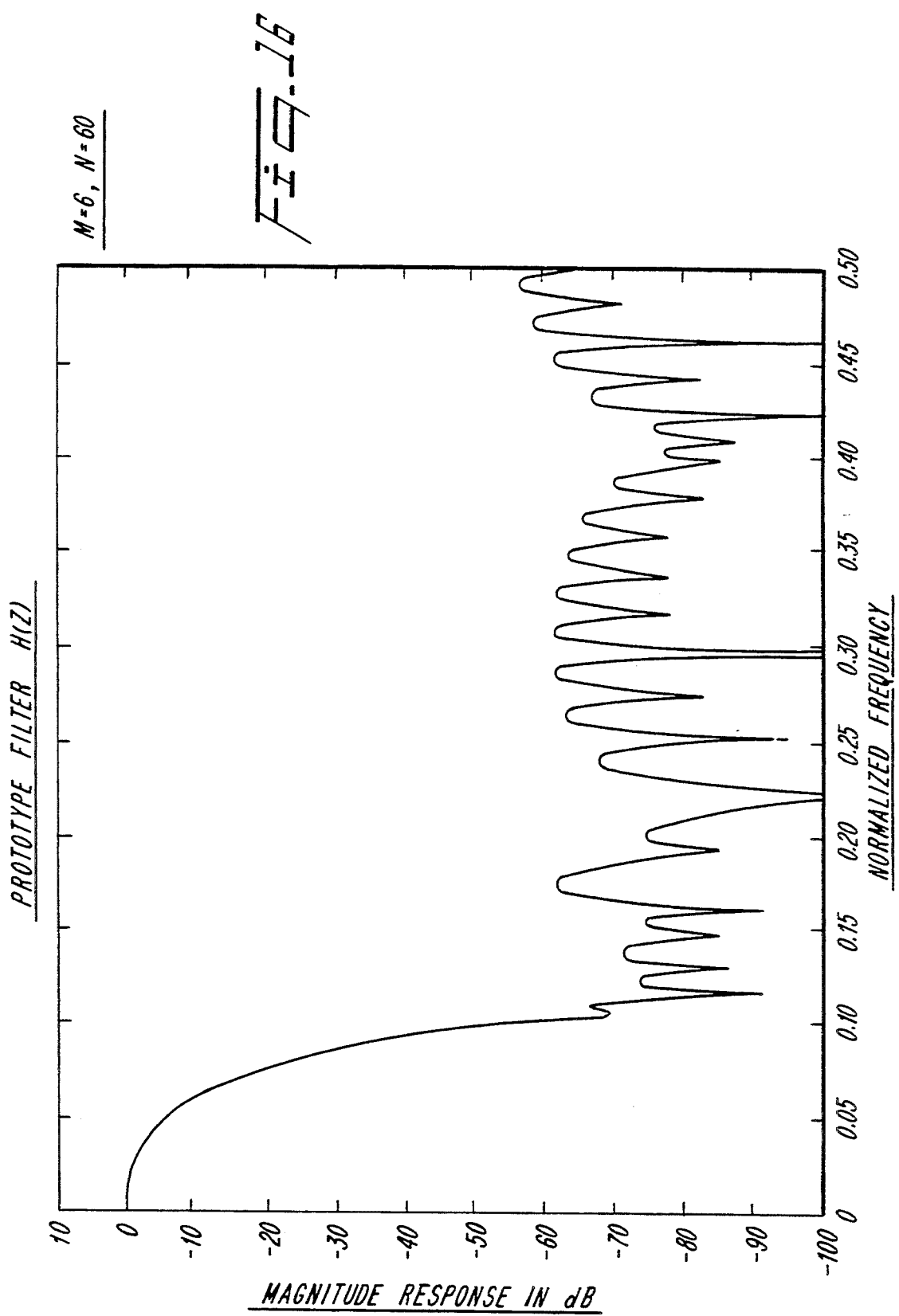
FIG. 16 illustrates a magnitude response plot for the prototype filter $H(z)$ using a quadratic-constrained least-squares formulation.
Figure 17:
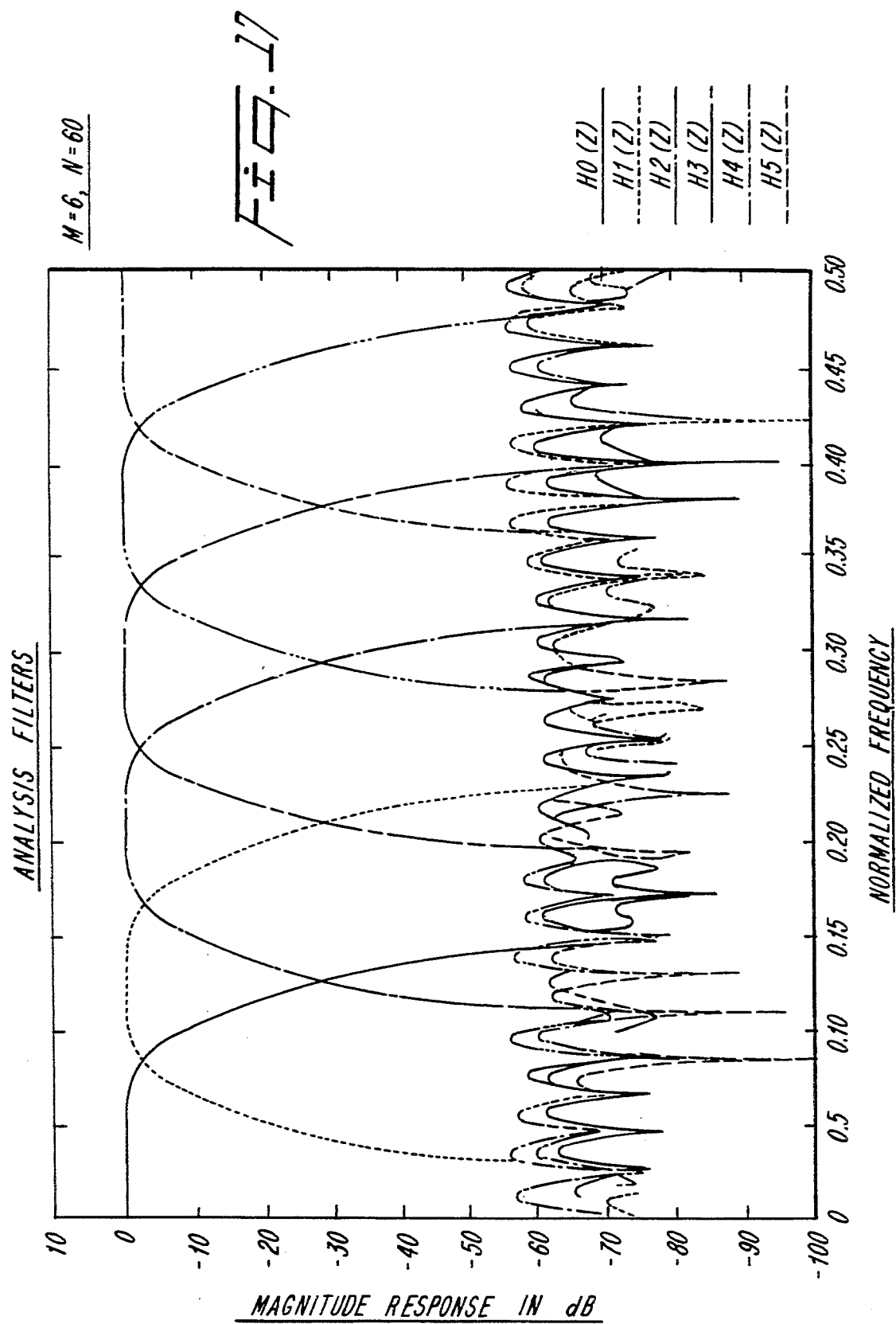
FIG. 17 shows a magnitude response plot of analysis filters $H_k(z)$.

Let $M = 6$ and $m = 5$, and the filter length is $N = 60$. The magnitude response of the optimized prototype filter H(z) and the corresponding analysis filters $H_k(z)$ are shown in FIGS. 16 and 17, respectively. The stopband attenuation of the optimized analysis filters is about $-57$ dB, which is much higher than those designed using conventional approaches. The optimized analysis filters is only an approximate perfect reconstruction filter bank since the quadratic constraints are approximately satisfies, with an error of about $1 \times 10^{-7}$. To obtain a perfect reconstruction filter bank, the lattice coefficients in the perfect reconstruction cosine-modulated filter bank using the prototype filters and the method of R. D. Koilpillai and P. P Vaidyanathan, "New Results of Cosine-Modulated FIR Filter Banks Satisfying Perfect Reconstruction" PROC IEEE INT CONF ASSP, Toronto Canada, pp. 1793-6, May 1991; and of P. P. Vaidyanathan and P. Q. Hoang, "Lattice Structure for Optimal Design and Robust Implementation of Two-Channel Perfect-Reconstruction QMF Bank," IEEE TRANS. ON ASSP, pp. 81-94, Jan. 1988.

Figure 18:
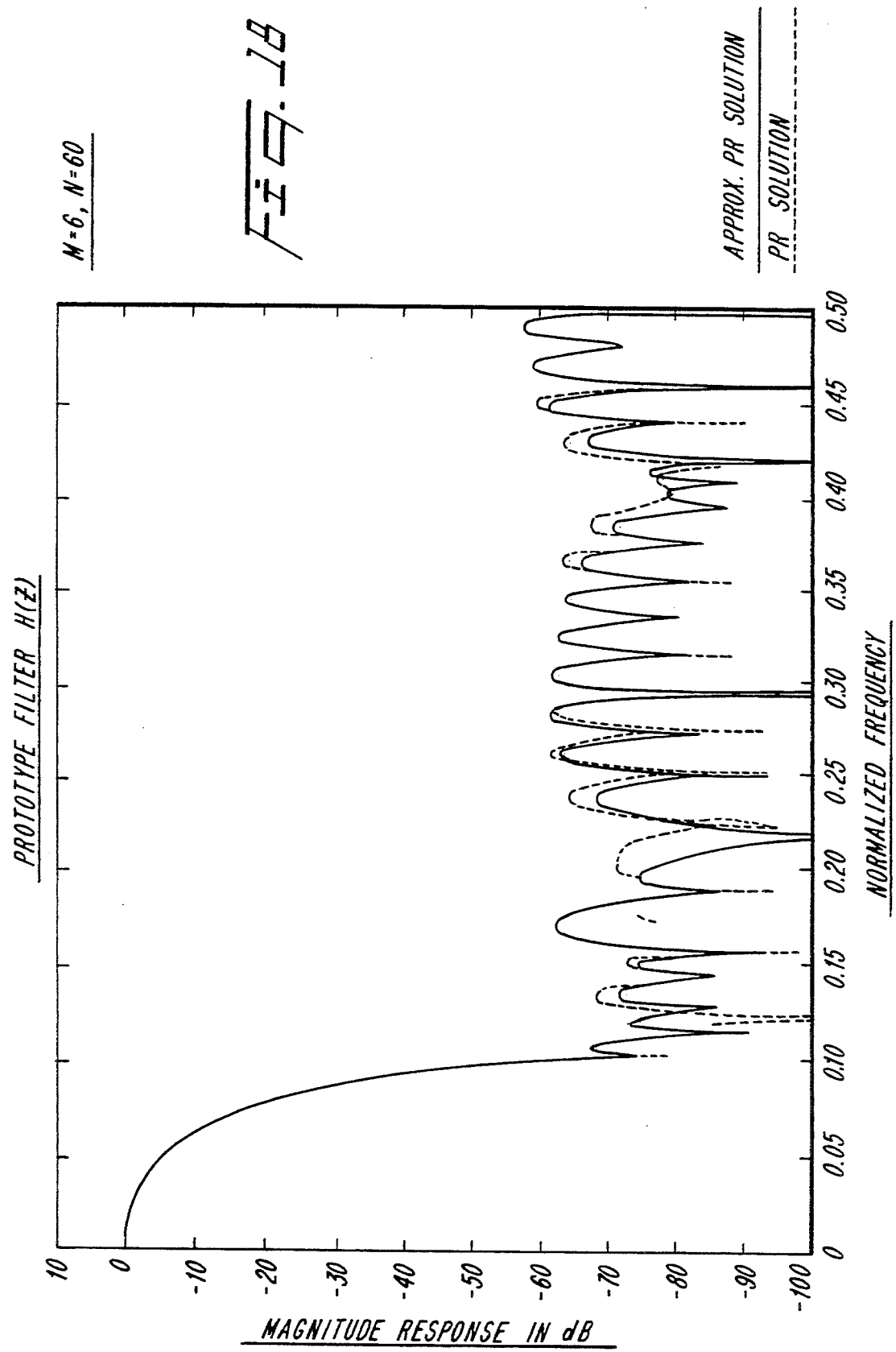
FIG. 18 shows a magnitude response plot of prototype filters $H(z)$ (approximate perfect reconstruction solution) and $H_{PR}(z)$ (perfect reconstruction solution)

Using the lattice coefficients, the perfect reconstruction prototype filter $H_{PR}(z)$ is computed, and the plot of the magnitude response of the prototype filter together with $|H_k(\rho^{j\omega})|$ are shown in FIG. 18, which illustrates that $H_{PR}(z)$ and H(z) are approximately the same. Therefore, the filter resulting from the quadratic-constrained least-squares approach can be used as a good initialization filter. Moreover, the lattice coefficients calculated from H(z) should be used as initialization values in a conventional perfect reconstruction cosine-modulated filter bank. See R. D. Koilpillai and P. P. Vaidyanathan, "New Results of Cosine-Modulated FIR Filter Banks Satisfying Perfect Reconstruction", PROC. IEEE INT. CONF. ASSP, Toronto, Canada, pp. 1793-6, May 1991.

It will be apparent to those skilled in the art that various modifications can be made to the pseudo quadrature mirror filter banks and method of the instant invention without departing from the scope or spirit of the invention, and it is intended that the present invention cover modifications and variations of the pseudo quadrature mirror filter banks and method provided they come in the scope of the appended claims and their equivalents.

I claim:

1. A pseudo-quadrature-mirror filter bank for near-perfect-reconstruction pseudo-quadrature-mirror filtering of an input signal, comprising:

a plurality of analysis filters, each of said plurality of analysis filters including, a first delay chain, operatively coupled to the input signal, forming a set of 2M parallel paths for buffering the input signal;

a first cascade of 2M polyphase components of an impulse transfer function H(z) of impulse response, h(n), operatively coupled to said first delay chain; and means, operatively coupled to said first cascade of 2M polyphase components, for generating a 2M-point Discrete Fourier Transform (DFT) to implement a 2M-point Discrete Cosine Transform (DCT) of the input signal, with each analysis filter having an impulse response, $h_k(n)$, of a $k^{th}$ analysis filter, where M is the number of subband signals, obtained by cosine-modulating an impulse response, h(n), of a prototype filter with linear phase, according to:

$$h_k(n) = 2h(n)\cos\left((2k+1)\frac{\pi}{2M}\left(n - \frac{N-1}{2}\right) + \theta_k\right)$$

-continued where $$\theta_k = (-1)^k \frac{\pi}{4},$$

$0 \leq n \leq N - 1,$
$0 \leq k \leq M - 1,$ and N is the length of the impulse response, h(n), of the prototype filter;

a plurality of synthesis filters, each of said plurality of synthesis filters including, a second delay chain, operatively coupled to the input signal, forming a set of 2M parallel paths for buffering the input signal;

a second cascade of 2M polyphase components of an impulse transfer function H(z) of impulse response, h(n), operatively coupled to said second delay chain; and means, operatively coupled to said second cascade of 2M polyphase components, for generating a 2M-point Discrete Fourier Transform (DFT) to implement a 2-point Discrete Cosine Transform (DCT) of the input signal, with each of said plurality of synthesis filters operatively coupled to a respective one of said plurality of analysis filters, each synthesis filter having an impulse response, $f_k(n)$, of a $k^{th}$ synthesis filter, obtained by cosine-modulating the impulse response, h(n), of the prototype filter according to:

$$f_k(n) = 2h(n)\cos\left((2k + 1)\frac{\pi}{2M}\left(n - \frac{N-1}{2}\right) - \theta_k\right)$$

where $$\theta_k = (-1)^k \frac{\pi}{4},$$

$0 \leq n \leq N - 1,$
$0 \leq k \leq M - 1,$ and N is the length of the impulse response, h(n), of the prototype filter; and wherein each impulse response, h(n), is found in accordance with:

$$\begin{cases} h^t S_n h = 0; \begin{cases} \left\lfloor \frac{(m+1)}{2} \right\rfloor \leq l \leq (m-1), m_1 = 0 \\ \left\lfloor \frac{(m+1)}{2} \right\rfloor \leq l \leq m, m_1 \neq 0 \end{cases} \\ h^t(S_n + JS_{n-mM-m1} + S_{n-mM-m1}J) h = 0; \\ 1 \leq l \leq \left\lfloor \frac{(m+1)}{2} \right\rfloor - 1 \\ h^t(JS_{mM+m1-1} + S_{mM+m1-1}J)h = \frac{1}{2M} \end{cases}$$

for even N, where $n = 2M(m-1) + 2m_1 - 1$ and $\lfloor x \rfloor$ is the greatest integer less than x, for x equal to $(m+1)/2$, and in accordance with:

$$\begin{cases} h^t V S_n V h = 0; \quad \left\lfloor \frac{m}{2} + 1 \right\rfloor \leq l \leq m \\ h^t V(S_n + JS_{n-mM-m1} + S_{n-nM-m1}J)Vh = 0; \ 1 \leq l \leq \left\lfloor \frac{m}{2} \right\rfloor \\ h^t V(S_{2nM+2m1} + JS_{mM+m1} + S_{mM+m1}J + JS_0 J)Vh = \frac{1}{2M} \end{cases}$$

for odd N, where $n = 2M(m-f) + 2m_1 - 1$ and $\lfloor x \rfloor$ is the greatest integer less than x, for x equal to any of $1 + m/2$ and $m/2$, where J is an inverse identity matrix, matrix V is defined to be:

$$V = \begin{pmatrix} I_{mM+m1} & 0 \\ 0 & \frac{1}{2} \end{pmatrix},$$

$$S_{nk,l} = \begin{cases} 1, & k + l = n \\ 0, & \text{otherwise;} \end{cases}$$

wherein each impulse response, h(n), is found to minimize the stopband error:

$$\int_{\omega_S}^{\pi} |H(e^{j\omega})|^2 d\omega = h^t P h$$

where P is a real, symmetric and positive definite matrix, with the elements, using a notation $P_{k,l}$ for denoting a $(k,l)^{th}$ element of matrix P, $$P_{k,l} = 2 \sum_{i=1}^{K} \beta_i \int_{\omega_{i,1}}^{\omega_{i,2}} (\cos\omega(k - l) + \cos\omega(N - 1 - k - l))d\omega,$$

$0 \leq k,l \leq mM + m_1 - 1$ where N is even, and where P is a real, symmetric and positive definite matrix, with the elements $$P_{k,l} = 2v \sum_{i=1}^{K} \beta_i \int_{\omega_{i,1}}^{\omega_{i,2}} [\cos\omega(k - l) + \cos\omega(N - 1 - k - l)]d\omega,$$

$0 \leq k,l \leq mM + m_1$ where N is odd, and where K is the number of stopbands of $H(e^{j\omega})$, $\beta_i$ are their relative weights and $\omega_{i,1}$ and $\omega_{i,2}$ are the bandedges of these stopbands, and $$v = \begin{cases} 1, & 0 \leq k,l \leq mM + m_1 - 1 \\ \frac{1}{2}, & k = mM + m_1, 0 \leq l \leq mM + m_1 - 1 \\ \frac{1}{2}, & l = mM + m_1, 0 \leq k \leq mM + m_1 - 1 \\ \frac{1}{4}, & k = l = mM + m_1; \end{cases}$$

and wherein the filter $H_k(z)$ is optimized by finding a least squares optimization $h_{opt}$ such that:

$$h_{opt} = \text{Min}_h \, h^t Ph \text{ subject to } \begin{cases} h^t Q_k h = 0, \\ h^t S_k h = 1. \end{cases}$$

2. The pseudo-quadrature-mirror filter bank set forth in claim 1, wherein the impulse response, h(n), provides plurality of analysis filters and the plurality of synthesis filters with a stopband attenuation less than −100 dB and with a reconstruction error less than −100 dB.

3. The pseudo-quadrature-mirror filter bank set forth in claim 1, wherein the stopband error $h^t Ph$ is minimized by subroutine DNOONF of the IMSL Math Library.

4. A pseudo-quadrature-mirror-filter bank for near-perfect-reconstruction pseudo-quadrature-mirror filtering an input signal, constructed by a process comprising the steps of:

finding an impulse response, h(n), of a prototype filter in accordance with:

$$\begin{cases} h^t S_n h = 0; \begin{cases} \frac{(m+1)}{2} \leq l \leq (m-1), \, m_1 = 0 \\ \frac{(m+1)}{2} \leq l \leq m, \, m \neq 0 \end{cases} \\ h^t (S_n + JS_{n-mM-m1} + S_{n-mM-m1} J)h = 0; \\ 1 \leq l \leq \frac{(m-1)}{2} - 1 \\ h^t (JS_{mM+m1-1} + S_{mM+m1-1} J)h = \frac{1}{2M} \end{cases}$$

for even N, where $n = 2M(m-l) + 2m_1 - 1$ and $\lfloor x \rfloor$ is the greatest integer less than x, for x equal to (m+1)/2, and in accordance with:

$$\begin{cases} h^t V S_n Vh = 0; \quad \frac{m}{2} + 1 \leq l \leq m \\ h^t V(S_n + JS_{n-mM-m1} + S_{n-mM+m1}J)Vh = 0; \, 1 \leq l \leq \frac{m}{2} \\ h^t V(S_{2mM+2m1} + JS_{mM+m1} + S_{mM+m1} J + JS_0 J)Vh = \frac{1}{2M} \end{cases}$$

for odd N, where $n = 2M(m-l) + 2m_1$ and $\lfloor x \rfloor$ is the greatest integer less than x, for x equal to any of 1+m/2 and m/2, where J is an inverse identity matrix, matrix V is defined to be:

$$V = \begin{pmatrix} I_{mM+m1} & 0 \\ 0 & \frac{1}{2} \end{pmatrix}$$

and $$(S_n)_{k,l} = \begin{cases} 1, \, k + l = n \\ 0, \, \text{otherwise:} \end{cases}$$

finding the impulse response, h(n), minimizing the stopband error:

$$\int_{\omega_S}^{\pi} |H(e^{j\omega})|^2 d\omega = h^t Ph$$

wherein P is a real, symmetric, and positive definite matrix, with the elements, using a notation $P_{k,l}$ for denoting a $(k,l)^{th}$ element of matrix P, $$P_{k,l} = 2 \sum_{i=1}^{K} \beta_i \int_{\omega_{i,1}}^{\omega_{i,2}} (\cos\omega(k-l) + \cos\omega(N-1-k-l))d\omega,$$

$$0 \leq k,l \leq mM + m_1 - 1$$

where N is even, and wherein P is a real, symmetric and positive definite matrix, with the elements $$P_{k,l} = 2\nu \sum_{i=1}^{K} \beta_i \int_{\omega_{i,1}}^{\omega_{i,2}} (\cos\omega(k-l) + \cos\omega(N-1-k-l))d\omega,$$

$$0 \leq k,l \leq mM + m_1$$

where N is odd, with K is the number of stopbands of $H(e^{j\omega})$, $\beta_i$ are their relative weights and $\omega_{i,1}$ and $\omega_{i,2}$ are the bandedges of these stopbands, and $$\nu = \begin{cases} 1, \, 0 \leq k,l \leq mM + m_1 - 1 \\ \frac{1}{2}, \, k = mM + m_1, \, 0 \leq l \leq mM + m_1 - 1 \\ \frac{1}{2}, \, l = mM + m_1, \, 0 \leq k \leq mM + m_1 - 1 \\ \frac{1}{4}, \, k = l = mM + m_1; \end{cases}$$

optimizing, by least squares optimization, $H_k(z)$ such that:

$$h_{opt} = \text{Min}_h h^t Ph \text{ subject to } \begin{cases} h^t Q_k h = 0, \\ h^t S_k h = 1; \end{cases}$$

generating a plurality of analysis filters from the impulse response, h(n), each analysis filters having an impulse response, $h_k(n)$, of a $k^{th}$ analysis filter generated by cosine-modulating the impulse response, h(n), with linear phase, according to:

$$h_k(n) = 2h(n)\cos\left((2k+1)\frac{\pi}{2M}\left(n - \frac{N-1}{2}\right) + \theta_k\right)$$

where $$\theta_k = (-1)^k \frac{\pi}{4},$$

$$0 \leq n \leq N - 1,$$
$$0 \leq k \leq M - 1,$$

and N is the length of the impulse response, h(n), of the prototype filter;

generating a plurality of synthesis filters, from the impulse response, h(n), each synthesis filter having an impulse response, $f_k(n)$, of a $k^{th}$ synthesis filter, of the prototype filter according to:

$$f_k(n) = 2h(n)\cos\left((2k+1)\frac{\pi}{2M}\left(n - \frac{N-1}{2}\right) - \theta_k\right)$$

where $$\theta_k = (-1)^k \frac{\pi}{4},$$

$$0 \leq n \leq N - 1,$$
$$0 \leq k \leq M - 1,$$

and N is the length of the impulse response, h(n), of the prototype filter; and coupling the output of each $k^{th}$ analysis filter with each $k^{th}$ synthesis filter, respectively.

5. The pseudo-quadrature-mirror-filter bank constructed by the process set forth in claim 4, wherein the step of finding the impulse response, h(n), minimizing the stopband error:

$$\int_{\omega_S}^{\pi} |H(e^{j\omega})|^2 d\omega = h^t P h$$

includes the steps of:

computing the stopband error $h^t P h$ and the gradient of $h^t P h$; and minimizing $h^t P h$.

6. The pseudo-quadrature-mirror-filter bank constructed by the process set forth in claim 4, wherein the step of optimizing by least squares optimization includes the steps of:

linearizing a set of quadratic constraints; and
minimizing a cost function $\Phi$.

7. The Pseudo-quadrature-mirror-filter bank constructed by the process set forth in claim 4, further comprising the steps of:

buffering, using a delay chain, the input signal to form a set of 2M parallel paths;

cascading the buffered input signal using a cascade of 2M polyphase components of H(z); and implementing a 2M-point Discrete Cosine Transform (DCT) using a 2M-point Discrete Fourier Transform (DFT).

8. A method, using a pseudo-quadrature-mirror-filter bank, for near-perfect-reconstruction pseudo-quadrature-mirror filtering an input signal, comprising the steps of:

finding an impulse response, h(n), of a prototype filter in accordance with:

$$\begin{cases} h^t S_n h = 0; \begin{cases} \left\lfloor \frac{(m+1)}{2} \right\rfloor \leq l \leq (m-1), m_1 = 0 \\ \left\lfloor \frac{(m+1)}{2} \right\rfloor \leq l \leq m, m_1 \neq 0 \end{cases} \\ h^t(S_n + JS_{n-mM-m_1} + S_{n-mM-m_1}J)h = 0; \\ 1 \leq l \leq \left\lfloor \frac{(m+1)}{2} \right\rfloor - 1 \\ h^t(JS_{mM+m_1-1} + S_{mM+m_1-1}J)h = \frac{1}{2M} \end{cases}$$

for even N, where $n = 2M(m-1) + 2m_1 - 1$ and $\lfloor x \rfloor$ is the greatest integer less than x, for x equal to $(m+1)/2$, and in accordance with:

$$\begin{cases} h^t V S_n V h = 0; \\ \left\lfloor \frac{m}{2} + 1 \right\rfloor \leq l \leq m \\ h^t V(S_n + JS_{n-mM-m_1} + S_{n-mM-m_1}J)Vh = 0; \\ 1 \leq l \leq \left\lfloor \frac{m}{2} \right\rfloor \\ h^t V(S_{2nM+2m_1} + JS_{mM+m_1} + S_{mM+m_1}J) + JS_0J)Vh = \frac{m}{2} \end{cases}$$

for odd N, where $n = 2M(m-1) + 2m_1$ and $\lfloor x \rfloor$ is the greatest integer less than x, for x equal to any of $1 + m/2$ and $m/2$, where J is an inverse identity matrix, matrix V is defined to be: and $$V = \begin{pmatrix} I_{mM+m_1} & 0 \\ 0 & \frac{1}{2} \end{pmatrix}$$

$$(S_n)_{k,l} = \begin{cases} 1, k + l = n \\ 0, \text{otherwise}; \end{cases}$$

finding the impulse response, h(n), minimizing the stopband error:

$$\int_{\omega_S}^{\pi} |H(e^{j\omega})|^2 d\omega = h^t P h$$

wherein P is a real, symmetric and positive definite matrix, with the elements, using a notation $P_{k,l}$ for denoting a $(k,l)^{th}$ element of matrix P, $$P_{k,l} = 2 \sum_{i=1}^{K} \beta_i \int_{\omega_{i,1}}^{\omega_{i,2}} (\cos\omega(k-l) + \cos\omega(N-1-k-l))d\omega,$$

$$0 \leq k,l \leq mM + m_1 - 1$$

where N is even, and wherein P is a real, symmetric and positive definite matrix, with the elements $$P_{k,l} = 2\nu \sum_{i=1}^{K} \beta_i \int_{\omega_{i,1}}^{\omega_{i,2}} (\cos\omega(k-l) +$$

$$\cos\omega(N-1-k-l))d\omega, 0 \leq k,l \leq mM + m_1 - 1$$

where N is odd, with K is the number of stopbands of $H(e^{j\omega})$, $\beta_i$ are their relative weights and $\omega_{i,1}$ and $\omega_{i,2}$ are the bandedges of these stopbands, and optimizing, by least squares optimization, $H_k(z)$ such that:

$$\nu = \begin{cases} 1, 0 \leq k,l \leq mN + m_1 - 1 \\ \frac{1}{2}, k = mM + m_1, 0 \leq l \leq mM + m_1 - 1 \\ \frac{1}{2}, l = mM + m_1, 0 \leq k \leq mM + m_1 - 1 \\ \frac{1}{4}, k = l = mM + m_1; \end{cases}$$

$$h_{opt} = \text{Min}_h h^t P h \text{ subject to} \begin{cases} h^t Q_k h = 0, \\ h^t S_k h = 1; \end{cases}$$

generating a plurality of analysis filters from the impulse response, h(n), each analysis filters having an impulse response, $h_k(n)$, of a $k^{th}$ analysis filter generated by cosine-modulating the impulse response, h(n), with linear phase, according to:

$$h_k(n) = 2h(n)\cos\left((2k+1)\frac{\pi}{2M}\left(n - \frac{N-1}{2}\right) + \theta_k\right)$$

where $$\theta_k = (-1)^k \frac{\pi}{4},$$

$0 \leq n \leq N - 1,$
$0 \leq k \leq M - 1,$ and N is the length of the impulse response, h(n), of the prototype filter;
generating a plurality of synthesis filters, from the impulse response, h(n), each synthesis filter having an impulse response, $f_k(n)$, of a $k^{th}$ synthesis filter, of the prototype filter according to:

$$f_k(n) = 2h(n)\cos\left((2k+1)\frac{\pi}{2M}\left(n - \frac{N-1}{2}\right) + \theta_k\right)$$

where $$\theta_k = (-1)^k \frac{\pi}{4},$$

$0 \leq n \leq N - 1,$
$0 \leq k \leq M - 1,$ and N is the length of the impulse response, h(n), of the prototype filter; and
coupling the output of each $k^{th}$ analysis filter with each $k^{th}$ synthesis filter, respectively.

9. The method set forth in claim 8, wherein the step of finding the impulse response, h(n), minimizing the stopband error:

$$\int_{\omega_S}^{\pi} |H(e^{j\omega})|^2 dw = h^t P h$$

includes the steps of:
computing the stopband error $h^t P h$ and the gradient of $h^t P h$; and
minimizing $h^t P h$.

10. The method set forth in claim 8, wherein the step of optimizing by least squares optimization includes the steps of:
linearizing a set of quadratic constraints; and
minimizing a cost function $\Phi$.

11. The method set forth in claim 8, further comprising the steps of:
buffering, using a delay chain, the input signal to form a set of 2M parallel paths;
cascading the buffered input signal using a cascade of 2M polyphase components of H(z); and
implementing a 2M-point Discrete Cosine Transform (DCT) using a 2M-point Discrete Fourier Transform (DFT).

12. A method, using a pseudo-quadrature-mirror-filter bank, for near-perfect-reconstruction pseudo-quadrature-mirror filtering an input signal, comprising the steps of:
finding an impulse response, h(n), of a prototype filter minimizing the stopband error:

$$\int_{\omega_S}^{\pi} |H(e^{j\omega})|^2 d\omega$$

optimizing the impulse response, h(n), of the prototype filter;
generating a plurality of analysis filters from the impulse response, h(n), each analysis filters having an impulse response, $h_k(n)$, of a $k^{th}$ analysis filter generated by cosine-modulating the impulse response, h(n), with linear phase, according to:

$$h_k(n) = 2h(n)\cos\left((2k+1)\frac{\pi}{2M}\left(n - \frac{N-1}{2}\right) + \theta_k\right)$$

where $$\theta_k = (-1)^k \frac{\pi}{4},$$

$0 \leq n \leq N - 1,$
$0 \leq k \leq M - 1,$ and N is the length of the impulse response, h(n), of the prototype filter;
generating a plurality of synthesis filters, from the impulse response, h(n), each synthesis filter having an impulse response, $f_k(n)$, of a $k^{th}$ synthesis filter, of the prototype filter according to:

$$f_k(n) = 2h(n)\cos\left((2k+1)\frac{\pi}{2M}\left(n - \frac{N-1}{2}\right) + \theta_k\right)$$

where $$\theta_k = (-1)^k \frac{\pi}{4},$$

$0 \leq n \leq N - 1,$
$0 \leq k \leq M - 1,$ and N is the length of the impulse response, h(n), of the prototype filter; and
coupling the output of each $k^{th}$ analysis filter with each $k^{th}$ synthesis filter, respectively.

* * * * *

UNITED STATES PATENT AND TRADEMARK OFFICE
CERTIFICATE OF CORRECTION

PATENT NO. : 5,436,940
DATED : July 25, 1995
INVENTOR(S) : Truong Q. Nguyen

It is certified that error appears in the above-identified patent and that said Letters Patent is hereby corrected as shown below:

Column 1, after line 5, Background of the Invention, insert as a first sentence --This invention was made with government support under Contract Number F19628-90-C-002 awarded by the Air Force. The government has certain rights in the invention.--.

Signed and Sealed this

Twenty-eighth Day of May, 1996

Attest:

BRUCE LEHMAN

Attesting Officer          Commissioner of Patents and Trademarks